US012711170B1

(12) United States Patent
Tewari et al.

(10) Patent No.: US 12,711,170 B1
(45) Date of Patent: Aug. 18, 2026

(54) DYNAMIC CONTEXT-BASED SEARCH SYSTEM AND METHOD

(71) Applicant: Wesco Digital Solutions (Ireland) Limited, Dublin (IE)

(72) Inventors: Dhruv Anadi Mohan Tewari, Karnataka (IN); Gajanand Chowdhary, Karnataka (IN); Himanshu Aditya, Karnataka (IN); Arjun Srinivasan, Cypress, TX (US); Mounika Alla, Tracy, CA (US); Swapnil Bajarang Yande, Balewadi (IN); Hemantharaju Subbanna, Cupertino, CA (US)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/335,283

(22) Filed: Sep. 22, 2025

(51) Int. Cl.
*G06F 16/00* (2019.01)
*G06F 16/334* (2025.01)
*G06F 16/335* (2019.01)
*G06F 16/338* (2019.01)
*G06F 40/30* (2020.01)

(52) U.S. Cl.
CPC ........ *G06F 16/3347* (2019.01); *G06F 16/335* (2019.01); *G06F 16/338* (2019.01); *G06F 40/30* (2020.01)

(58) Field of Classification Search
CPC .. G06F 16/3347; G06F 16/338; G06F 16/335; G06F 40/30
USPC ........................................................ 707/706
See application file for complete search history.

(56) References Cited

U.S. PATENT DOCUMENTS

| | | | | |
|---|---|---|---|---|
| 12,475,154 | B1 * | 11/2025 | Anand | G06F 16/345 |
| 2024/0274025 | A1 * | 8/2024 | Vleugels | G09B 7/00 |
| 2024/0370446 | A1 * | 11/2024 | Frieder | G06F 16/243 |
| 2024/0386015 | A1 * | 11/2024 | Crabtree | G06F 16/9024 |
| 2025/0217418 | A1 * | 7/2025 | Bathwal | G06F 16/9538 |

* cited by examiner

*Primary Examiner* — Monica M Pyo
(74) *Attorney, Agent, or Firm* — K&L Gates LLP

(57) ABSTRACT

The present disclosure provides a system and method for dynamic context-based searching. A query embedding may be generated for an obtained search query and relevant feedback-derived user interaction embeddings may be retrieved from a vector database based on similarities between the user interaction embeddings and the query embedding. The user interaction embeddings encode feedback parameters extracted from user interface logs and session data for user interface interactions with search results of prior queries. A query contextual classification vector generated based on the retrieved user interaction embeddings and the query embedding can be used to dynamically route the query embedding to a search model optimized for the search query. The query embedding may be processed using the optimized search model to retrieve candidate results. The ranking of the candidate results may be dynamically adjusted based on the user interaction embeddings to prioritize candidate results aligned with prior user preferences.

21 Claims, 4 Drawing Sheets

DYNAMIC CONTEXT-BASED SEARCH SYSTEM AND METHOD

TECHNICAL FIELD

The present disclosure relates generally to the field of information retrieval and data processing, and more specifically to systems and methods for dynamic context-based search routing and retrieval from digital repositories using machine learning-driven query processing and user feedback adaptation.

BACKGROUND

Search systems for retrieval of information from digital repositories, such as product databases or other data sources, are frequently used in technical applications such as e-commerce, database management, and data analysis. Traditional search systems often rely on lexical search methods that match user queries to search results based on keywords or exact terms. These systems struggle to interpret the context or intent behind a user's search query, particularly when queries are vague or context-dependent, leading to irrelevant or suboptimal search results. This limitation can significantly degrade user experience, as the systems fail to deliver results that accurately align with users' needs.

Lexical search approaches can be especially problematic when attempting to process queries that require a nuanced understanding of context or implicit intent. For example, users may input ambiguous terms or phrases that depend on contextual factors, such as product categories or user preferences, which lexical search systems are generally ill-equipped to handle. This inability to accurately process such queries hinders the search systems' ability to find and prioritize relevant results, often forcing users to refine queries manually or sift through large volumes of irrelevant data. Additionally, these systems typically lack mechanisms to adapt dynamically to user feedback, limiting their ability to improve result quality over time.

Accordingly, there exists a need for alternate systems and methods for search routing and retrieval that can interpret context and adapt to user feedback to retrieve precise and relevant search results from digital repositories.

SUMMARY

In various embodiments, the present disclosure provides a method for dynamic search routing and retrieval using feedback-derived user interaction embeddings. The method is a computer-implemented method performed using a server-based query processing module comprising at least one processor and a memory. The method includes obtaining a search query via a user interface at a remote user device and generating a query embedding for the query by executing a transformer-based embedding model. The query embedding represents the search query as an n-dimensional numeric vector. The method further includes retrieving relevant feedback-derived user interaction embeddings from a vector database based on similarities between the user interaction embeddings and the query embedding. The user interaction embeddings encode feedback parameters extracted from user interface logs and session data for user interface interactions with search results of prior queries. The method further includes generating a query contextual classification vector for the search query based on aggregating the retrieved user interaction embeddings, organization metadata, and query parameters derived from the query embedding. The method further includes dynamically routing the query embedding to a search model optimized for the search query. The optimized search model is selected from a model registry stored in the memory using the query contextual classification vector. The method further includes processing the query embedding using the optimized search model to retrieve candidate results and dynamically adjusting a ranking of the candidate results based on computing similarities between the candidate result embeddings and the user interaction embeddings to prioritize candidate results aligned with prior user preferences. The method further includes displaying the dynamically adjusted candidate results as search results via the user interface.

In some embodiments, the method further includes selecting, by a dynamic routing engine, the search model from a lexical search model, a semantic search model, or a combined lexical-semantic search model stored in the model registry.

In some embodiments, selecting the lexical search model includes computing, by a dynamic routing engine, a cosine similarity between the query embedding and a keyword-based reference embedding in the model registry to determine a keyword density score above a keyword density threshold.

In some embodiments, selecting the semantic search model includes computing, by a dynamic routing engine, a cosine similarity between the query contextual classification vector and a semantic reference vector in the model registry to determine a semantic intent score above a semantic intent threshold.

In some embodiments, selecting the combined lexical-semantic search model comprises computing, by a dynamic routing engine, a first cosine similarity between the query embedding and a keyword-based reference embedding to determine a keyword density score above a keyword density threshold and a second cosine similarity between the query contextual classification vector and a semantic reference vector to determine a semantic intent score above a semantic intent threshold.

In some embodiments, the method includes monitoring, by the user interface, post-query user interactions to generate an additional interface log and additional session data for the search query, extracting, by a feedback loop module, additional feedback parameters from the additional interface log and additional session data, and updating, by the feedback loop module, the vector database to include additional user interaction embeddings generated based on the additional feedback parameters.

In some embodiments, extracting the additional feedback parameters from the additional interface log and additional session data includes extracting, by a feedback loop module, numerical features including one or more of a click-through rate, a dwell time, a bounce rate, and result selection data.

In some embodiments, the method further includes normalizing, by the feedback loop module, the numerical features and encoding, by the feedback loop module, the normalized numerical features as the additional user interaction embeddings using a neural network.

In some embodiments, updating the vector database includes appending, by a feedback loop module, the additional user interaction embeddings to an append-only memory segment of the vector database and updating a locality-sensitive hash (LSH) table using an incremental indexing operation.

In some embodiments, the vector database, managed by the feedback loop module, is user-specific, association feedback-derived user interaction embeddings with a single user or class of users.

In some embodiments, updating the vector database includes adjusting, by a feedback loop module, the user interaction embeddings based on a negative feedback indicator by recomputing cosine similarities to reduce weights of embeddings associated with non-selected results. The negative feedback indicator can include at least one of a cart abandonment or absence of product selection within a dwell time threshold.

In some embodiments, the method includes prompting, by a feedback loop module via the user interface, the collection of explicit user feedback on search result relevance after a dwell time threshold and storing, by the feedback loop module, the explicit feedback as a user interaction embedding in the vector database.

In some embodiments, generating the query embedding includes preprocessing, by a query classification module, the search query to produce a normalized query for input to the transformer-based embedding model. The preprocessing may include tokenizing the search query using rule-based logic and performing semantic enrichment using a large language model (LLM) executed on a graphics processing unit (GPU) or tensor accelerator.

In some embodiments, the method includes executing, by a query classification module, a retrieval-augmented classification using a retrieval-augmented generation (RAG)-based model to retrieve the relevant user interaction embeddings and the organizational metadata from the vector database and applying, by the query classification module, rule-based weighting to compute a cosine similarity between the query embedding and the retrieved user interaction embeddings.

In some embodiments, processing the query embedding using the optimized search model to generate the candidate results comprises executing, by a search execution module, the selected search model to identify candidate results from one or more product databases.

In some embodiments, dynamically adjusting the ranking of the candidate results includes increasing, by an embedding-augmented re-ranking model, a candidate rank score of a candidate result associated with a user interaction embedding indicative of a prior product selection.

In some embodiments, the user interface logs and session data include one or more of result selection data, query refinement data, clickstream logs, bounce rate data, product return logs, dwell time data, scroll depth data, pointer trajectory sampling, and click sequence timing data.

In some embodiments, determining the query contextual classification vector includes personalizing, by a query classification module, the query contextual classification vector based on hierarchical user data including at least one of user-specific history, department-level history, or enterprise-level history retrieved from the vector database.

In some embodiments, generating the query embedding includes enriching, by a semantic analysis module, the query embedding with structured metadata including at least one of product category, product attributes, or organizational rules before selecting the search model.

In some embodiments, the present disclosure provides a dynamic context-based search system. The system includes a user interface, a vector database, a query classification module, a model registry, a dynamic routing engine, and a feedback loop module. The user interface is operable to obtain a search query at a remote user device. The vector database is operable to store user interaction embeddings encoding feedback parameters extracted from user interface logs and session data for user interface interactions with search results of prior queries. The query classification module is operable to generate a query embedding for the query by executing a transformer-based embedding model, retrieve relevant feedback-derived user interaction embeddings from the vector database based on similarities between the user interaction embeddings and the query embedding, and generate a query contextual classification vector for the search query based on aggregating the retrieved user interaction embeddings, organization metadata, and query parameters derived from the query embedding. The query embedding represents the search query as an n-dimensional numeric vector. The model registry is operable to store a lexical search model, a semantic search model, and a combined lexical-semantic search model. The dynamic routing engine is operable to dynamically route the query embedding to a search model from the model registry optimized for the search query. The dynamic routing engine may select the optimized search model from the lexical search model, the semantic search model, and the combined lexical-semantic search model using the query contextual classification vector. The dynamic routing engine is operable to process the query embedding using the optimized search model to retrieve candidate results. The feedback loop module is operable to dynamically adjust a ranking of the candidate results based on computing similarities between the candidate result embeddings and the user interaction embeddings to prioritize candidate results aligned with prior user preferences encoded in the user interaction embeddings. The user interface is operable to display the dynamically adjusted candidate results as search results for the query.

In some embodiments, the present disclosure provides a non-transitory computer-readable medium storing instructions. The instructions are executable by one or more processors to cause a computing system to obtain a search query via a user interface at a remote user device and generate a query embedding for the query by executing a transformer-based embedding model. The query embedding represents the search query as an n-dimensional numeric vector. The instructions further cause the computing system to retrieve relevant feedback-derived user interaction embeddings from a vector database based on similarities between the user interaction embeddings and the query embedding. The user interaction embeddings encode feedback parameters extracted from user interface logs and session data for user interface interactions with search results of prior queries. The instructions further cause the computing system to generate a query contextual classification vector for the search query based on aggregating the retrieved user interaction embeddings, organization metadata, and query parameters derived from the query embedding. The instructions further cause the computing system to dynamically route the query embedding to a search model optimized for the search query. The optimized search model is selected from a model registry stored in the memory using the query contextual classification vector. The instructions further cause the computing system to process the query embedding using the optimized search model to retrieve candidate results and dynamically adjust a ranking of the candidate results based on computing similarities between the candidate result embeddings and the user interaction embeddings to prioritize candidate results aligned with prior user preferences. The instructions further cause the computing system to display, via the user interface at the remote device, the dynamically adjusted candidate results as search results for the query.

DESCRIPTION

Figure 1:
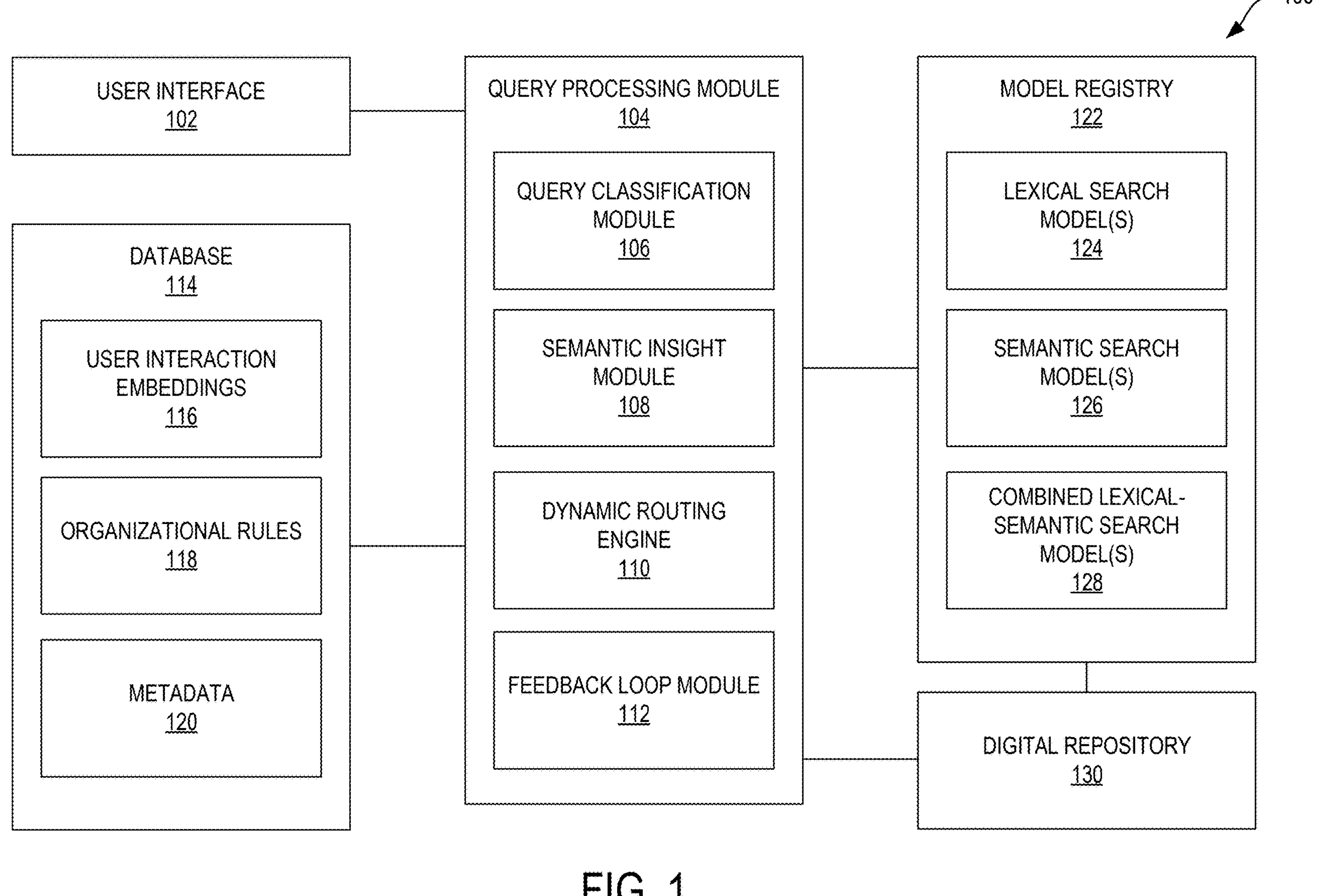
FIG. 1 is a schematic diagram illustrating an embodiment of a dynamic context-based search system.

The present disclosure provides a system and method for dynamic context-based search. The system and method can dynamically route a search query to an optimized search model based on context derived from the search query. To implement dynamic routing, the system and method can generate a query contextual classification vector that contextually classifies the search query. The system and method can then route the search query to the optimized search model based on the contextual classification encoded by the contextual classification vector. For example, depending on query context, the optimized search model may be a lexical search model, a semantic search model, or a combined lexical-semantic search model (e.g., implementing both lexical and semantic search techniques). The contextual classification of the search query may incorporate user feedback derived from user interactions with search results of prior queries, thus improving contextual classification and query routing by learning from user behavior.

The system and method may also dynamically adjust the search results that are retrieved using the optimized search model based on feedback derived from user interactions with search results of prior queries. For example, the system and method may incorporate an embedding-augmented re-ranking module to dynamically adjust the ranking of candidates results retrieved by the optimized search model to prioritize candidate results aligned with prior user preferences derived from user interactions with the search results of prior queries. Thus, system and method may use learning derived from user behavior to present more relevant and personalized results to users.

The system and method may iteratively update the inputs used for dynamically routing search queries to optimized search models and/or for dynamically retrieving the search results. These inputs may be derived based on monitoring user interactions each time search results are presented to a user. For example, the search results may be displayed via a user interface. Interface logs and session data may be generated based on user interaction with the search results via the interface. User interaction feedback parameters may be extracted from the logs and session data (e.g., dwell time over a search result, bounce rate after viewing results, click through rate on a result, selection and/or cart addition of results, query refinement, pointer trajectory, click sequence timing). User interaction embeddings may be generated based on the extracted user feedback parameters, and the user interaction embeddings may be added to a vector database. Thus, the vector database may be iteratively updated with additional user interaction embeddings each time search results are displayed to the user and the user interacts with the results. Upon receiving a new query, query contextual classification and therefore routing of the new query may be performed based on these iteratively updated user interaction embeddings. Search result retrieval and ranking may also be performed based on these iteratively updated user interaction embeddings.

The disclosed system and method provide significant technological advantages by contextually classifying user queries through the generation and application of contextual classification vectors, which can encapsulate multifaceted query attributes such as intent, domain specificity, and temporal relevance. This classification enables routing of the query to an optimized search model-whether lexical for precise term matching, semantic for conceptual understanding, or a hybrid for comprehensive retrieval-thereby surpassing traditional search systems that rely on rigid keyword-based or uniform semantic processing. Prior approaches often suffer from inefficiencies in handling diverse query types, leading to irrelevant results or excessive computational overhead due to non-selective model application. In contrast, the vector-based contextual classification provided herein can dynamically align the query with the most suitable processing pathway, enhancing search accuracy, reducing latency, and optimizing resource utilization across varied data corpora.

This enhanced capability to precisely route queries based on contextual insights ensures that the system and method deliver highly relevant and timely results, fostering a more efficient information retrieval process that adapts to the nuances of user needs. By enabling such tailored processing, the system and method not only streamline data access but also support advanced applications in domains requiring rapid and precise information handling, distinguishing it as a robust solution for modern computational challenges.

Furthermore, the system and method introduce a technological advancement by dynamically adjusting retrieved results through the integration of user interaction embeddings, which encode feedback parameters from interface interactions with prior search outputs, such as dwell time, selection patterns, and navigation behaviors. Unlike conventional systems that often treat search sessions as static or rely on post-hoc refinements, the system and method provided herein enable continuous refinement of search result sets by embedding real-time user signals into the retrieval pipeline, mitigating issues like result drift or persistent irrelevance in iterative queries. Prior methods often require explicit user corrections or suffer from feedback loops that degrade over time, whereas this embedding mechanism enables adaptive re-ranking and augmentation, improving result precision and user satisfaction without necessitating additional computational layers.

Such dynamic refinement based on embedded user interactions transforms the search experience into an iterative, learning-driven process that evolves with user engagement, ensuring sustained relevance and efficiency in information delivery. Thus, the system and method provide a technological improvement by enabling complex, evolving query contexts to be analyzed and processed more accurately and efficiently, making it particularly suited for environments where user intent may shift rapidly.

The system and method further provide technological advantages in their ability to dynamically update retrieved results in real time as the user interacts with the user interface, leveraging continuous monitoring of interaction signals to trigger immediate re-processing and re-presentation of content. This real-time adaptability addresses limitations of static search outputs in prior systems, where users must initiate new queries or endure outdated results amid ongoing sessions. By integrating live feedback into the retrieval loop, the system minimizes response delays and enhances contextual alignment, providing a fluid and responsive user experience that aligns with the pace of human cognition and decision-making.

Furthermore, the system and method enable extracted feedback from user interactions to be technically leveraged to refine the contextual classification process itself, by updating the model parameters—such as vector weighting or domain priors-based on aggregated signals across sessions. This feedback-driven adjustment overcomes the rigidity of static classification models in prior approaches, which often fail to evolve with shifting user patterns or emerging data trends, leading to gradual performance degradation. In contrast, the system and method provided herein can achieve a self-improving cycle where classification accuracy increases over multiple searches and in real time during a single search session, reducing misrouting errors and enhancing overall system robustness in diverse operational scenarios.

FIG. 1 illustrates an embodiment of dynamic context-based search system 100. The system 100 includes a user interface 102, a query processing module 104, a database 114, a model registry 122, and a digital repository 130. As discussed in further detail below, the user interface 102 obtains a search query. The query processing module 104 receives the search query, determines a contextual classification for the search query, and routes the search query to a search model from the model registry 122 based on the contextual classification. Search results are retrieved from the digital repository 130 by processing the query (e.g., a query embedding) using the routed-to search model. The retrieved search results are displayed via the user interface 102. The query processing module 104 can extract feedback parameters based on monitoring user interactions with the search results at the user interface 102 and store the feedback parameters in the database 114. The query processing 104 may reference the feedback parameters stored in the database 114 to enhance the contextual classification, routing, and result retrieval for subsequent queries.

The user interface 102 can obtain search queries based on inputs provided by users. The user interface 102 may obtain search queries in various formats. For example, queries may be submitted as text-based inputs, such as natural language phrases like "budget laptops for gaming," keywords like "laptop i7 SSD," numeric or alphanumeric strings such as a product serial number (e.g., "SN123456"), or any combination of these inputs. In some examples, the queries may target products listed in a product database within the digital repository 130, such as e-commerce inventories, or other types of digital repositories, such as customer relationship management (CRM) systems containing client interaction records, knowledge bases with technical documentation, or academic repositories with research articles. The queries may imply context or intent related to the user's search, such as preferences for specific product attributes (e.g., "laptops under 4500"), temporal constraints (e.g., "new releases in 2025"), or implicit goals (e.g., "best computer for video editing" indicating a need for high-performance specifications). For instance, a vague query like "affordable tech" may imply a user's intent to explore cost-effective electronics, while a query like "project management tools Q3" may seek software solutions with recent updates, reflecting contextual factors like user role or organizational needs.

The user interface 102 can communicate the search queries it obtains to the query processing module 104 for processing. The user interface 102 can further present search results for processed queries to the users. The user interface 102 can enable users to input search queries in various forms that infer intent or context and receive relevant search results.

The user interface 102 may obtain user queries submitted through various input methods, such as text-based input, voice commands, or structured query forms. For example, a user might submit a text-based query such as, "find laptops with high battery life and SSD under 4800," into a text field of the user interface 102. As another example, the user interface 102 may include a voice-activated assistant to capture a spoken query like "show me recent project management software," with the user interface 102 implementing natural language processing (NLP) techniques to interpret the spoken input. Structured query forms may allow users to select filters, such as product categories (e.g., electronics, software) or specific attributes (e.g., price range, release date), to refine their search intent. These input methods can support queries targeting product databases or other digital repositories, such as internal company records or public data archives, ensuring flexibility for diverse use cases.

The user interface 102 may present search results generated by the system 100 in various formats. For example, for a query targeting a product database, the user interface 102 may display search results as a detailed report, listing product details like price, specifications, availability, and/or a product image. The results may be presented as a list via a web page, allowing the user to scroll through an ordered list of results. The order of the results may be based on a result ranking, as discussed further herein. The results may be selectable, allowing users to click on an item to view additional details (e.g., full product specifications, customer reviews) or add the product to a cart for purchase in an e-commerce context. The user interface 102 may also provide an interactive dashboard with elements like charts (e.g., price comparisons), graphs (e.g., performance metrics), or images (e.g., product visuals) to summarize results from digital repositories. These formats can enhance user comprehension by organizing results according to query context (e.g., prioritizing low-cost items for a "budget" query, prioritizing recent results for a time-sensitive search, etc.).

The user interface 102 can collect session data and interface logs to capture user interactions with the search results, enabling the system 100 to generate feedback parameters for enhancing query processing. User interactions may include dwell time (the duration a user spends viewing a search result before taking an action), bounce rate (the frequency of users leaving the results page without interaction), click-through rate (the percentage of users clicking on a result), selection and/or cart addition of results (e.g., adding a product to a shopping cart), query refinement (e.g., modifying the query to "laptops under 4500 with SSD" after initial results), pointer trajectory (e.g., the path of a mouse cursor over the results page), and click sequence timing (e.g., the timing between consecutive clicks on results). Session data may be generated by tracking user actions within a single interaction session, stored as structured records in formats like JSON, capturing events such as clicks, hovers, or scrolls. Interface logs may be generated by logging user interface events, such as button clicks or form submissions, using client-side scripts (e.g., JavaScript event listeners) embedded in the user interface 102. The interface logs and session data may be transmitted to the query processing module 104, specifically the feedback loop module 112, via application program interface (API) calls or message queues, ensuring real-time capture and encoding of interactions for storage in the database 114 as user interaction embeddings 116.

The user interface 102 may track which user or class of user is interacting with the system 100, enabling the query processing module 104 to tailor search results to user preferences by utilizing on user-specific feedback-derived user interaction embeddings 116 stored in the database 114, as discussed further herein. In some examples, the user interface 102 may implement user tracking through authentication mechanisms, such as requiring users to log in with unique credentials (e.g., username and password) or single sign-on (SSO) tokens, which associate each session with a user ID or class (e.g., department or role, such as "marketing team" or "researcher"). In other examples, the user interface 102 may track users without requiring user credentials by using methods such as IP address tracking, which can identify a user's device based on its network address, device fingerprinting, which generates a unique identifier from device characteristics (e.g., browser type, screen resolution, or operating system), or session cookies, which assign a temporary identifier to a user's session for tracking interactions across multiple queries.

The user interface 102 may embed the user ID or class identifier in session data and interface logs, enabling the query processing module 104 to link monitored user interface interactions to specific users or classes in the database 114. This can allow the query processing module 104 to personalize results by referencing user-specific or class-specific interaction embeddings 116, prioritizing results aligned with prior preferences (e.g., a user's frequent selection of budget electronics). In some examples, the user interface 102 may limit access to certain search results based on the user ID or class identifier, ensuring users only view data they are authorized to access, such as department-specific product records in the digital repository 130.

The query processing module 104 can coordinate the processing of search queries received from the user interface 102 to deliver contextually relevant search results retrieved from the digital repository 130. The query processing module 104 can include a query classification module 106, a semantic insight module 108, a dynamic routing engine 110, and/or a feedback loop module 112. As discussed in more detail below, the query classification module 106 can process search queries by generating query embeddings and contextually classifying queries to assist with search model selection. The semantic insight module 108 can enrich query embeddings with structured metadata to enhance contextual understanding. The dynamic routing engine 110 can route queries to a search model selected from the model registry 122 based on the contextual classification. The feedback loop module 112 can monitor user interactions, extract feedback parameters, and update the database 114 for refining future query processing and result ranking.

The query classification module 106 can process search queries obtained via the user interface 102 by generating query embeddings that capture their semantic and contextual content, enabling effective routing and retrieval. The query classification module 106 may utilize a transformer-based embedding model, such as a Bidirectional Encoder Representations from Transformers (BERT) model, to convert a search query into an n-dimensional numeric vector. For example, a query like "budget gaming laptops" may be processed to produce a query embedding that encodes its context related to cost-effective, high-performance electronics.

The query classification module 106 may preprocess search queries prior to generating the query embeddings. For example, the query classification module 106 may normalize a search query by converting text to lowercase, removing punctuation, and correcting spelling errors to standardize the input, ensuring consistency across queries with similar intent (e.g., normalizing "Budget Laptops" and "budget laptops" to the same format). The query classification module 106 may employ rule-based tokenization to break the search query into components (e.g., "budget," "gaming," "laptops") and/or may employ semantic enrichment using a large language model (LLM) executed on a graphics processing unit (GPU) or tensor accelerator. In some examples, the query classification module 106 may be implemented using a central processing unit (CPU). Semantic enrichment enhances the search query by incorporating contextual relationships and synonyms (e.g., associating "budget" with "affordable" or "cost-effective") to capture implicit intent, ensuring the query embedding reflects nuanced user goals (e.g., seeking economical yet high-performance gaming hardware). Preprocessing to normalize the search queries ensures the query embeddings accurately represent the queries' context by reducing variability in syntax and focusing on semantic content, allowing the transformer-based model to generate embeddings that capture the query's intent (e.g., cost-effective gaming hardware) rather than being skewed by formatting differences.

The query classification module 106 can determine the contextual classification for search queries by leveraging user interaction embeddings 116, organizational rules 118, and/or organizational metadata 120 from the database 114. User interaction embeddings 116 are n-dimensional numeric vectors encoding feedback parameters derived from user interface interactions with prior search results (e.g., click-through rate, dwell time, result selection), reflecting user preferences or behavior. Organizational rules 118 may include predefined constraints imposed by the organization or entity associated with the digital repository 130, such as enterprise policies or department-specific guidelines (e.g., "prioritize vendors with sustainability certifications"), guiding search query interpretation. Organizational metadata 120 can include structured data associated with the digital repository 130, such as product categories, attributes, or enterprise hierarchies (e.g., "electronics" or "project management software"), providing context for search query intent. The query classification module 106 can aggregate retrieved interaction embeddings 116, organizational rules 118, and organizational metadata 120 with query parameters (e.g., keywords, filters) to determine a contextual query classification encapsulating user-specific, departmental, or enterprise-level context, enabling precise search model selection by the dynamic routing engine 110.

The query classification module 106 may retrieve relevant user interaction embeddings 116 from the database 114 based on similarities with the query embedding. In some examples, the query classification module 106 may identify and retrieve the relevant user interaction embeddings 116 by computing cosine similarities between the query embedding and user interaction embeddings 116. For example, for a query targeting a product database in the digital repository 130, the module may retrieve user interaction embeddings 116 encoding a user's preference for laptops under 4500 based on prior selections. In some examples, the query classification module 106 may employ retrieval-augmented classification using a retrieval-augmented generation (RAG)-based model to efficiently retrieve the user interaction embeddings 116, organizational rules 118, and/or organizational metadata 120 from the database 114. A RAG-based model combines retrieval and generation by first retrieving relevant data (e.g., embeddings 116, metadata 120) from the database 114 using vector similarity searches and then generating contextually enriched outputs using a transformer-based model. The RAG-based model may be implemented with a dual-encoder architecture, where one encoder processes the query embedding and another encodes database contents, executed on GPUs for high-speed vector operations. In some examples, the RAG-based model may be implemented using a central processing unit (CPU). The RAG-based model can apply rule-based weighting to prioritize embeddings closely aligned with the search query's intent by assigning higher weights to embeddings with stronger cosine similarities or those matching organizational rules 118 (e.g., weighting embeddings for "budget laptops" higher if the user's history prioritizes low-cost electronics).

In some examples, the query classification module 106 may generate a query contextual classification vector representing the contextual classification. The query classification module 106 may employ machine learning models, such as transformer-based models or neural networks, to aggregate the query embedding, the retrieved user interaction embeddings 116, and organizational metadata 120, combining them with query parameters (e.g., keywords, filters) to generate the query contextual classification vector. For instance, a transformer-based model may be employed to process the query embedding and user interaction embeddings 116 to identify semantic relationships, while a neural network may be employed to integrate metadata 120 to incorporate organizational context. The query contextual classification vector aggregates the query embedding, the relevant user interaction embeddings 116, and query parameters (e.g., keywords, filters) to encapsulate the query's context, such as user-specific preferences or organizational constraints. In some examples, the query classification module 106 personalizes the query contextual classification vector for the user submitting the search query using hierarchical user data, including user-specific history (e.g., past searches for electronics), department-level history (e.g., marketing team preferences), and/or enterprise-level history (e.g., company-wide product priorities), retrieved from the organizational metadata 120 in the database 114. For example, a search query for "project management tools" may result in a classification vector prioritizing recent software releases for a user in a project management role.

The query classification module 106 can enhance the system 100's ability to handle vague or context-dependent queries by leveraging user interaction embeddings 116 and organizational metadata 120 to refine contextual classification. For example, a query like "affordable tech" may be ambiguous, but the module query classification module 106 can infer a focus on cost-effective electronics by retrieving user interaction embeddings 116 indicating prior user selections of budget items and metadata 120 specifying price ranges. The RAG-based model can ensure efficient retrieval by indexing the database 114 with locality-sensitive hash (LSH) tables, enabling fast nearest-neighbor searches for relevant embeddings. The resulting query contextual classification vector can provide a comprehensive representation of the search query's intent, incorporating user behavior (via user interaction embeddings 116), enterprise constraints (via rules 118), and data context (via metadata 120), which the dynamic routing engine 110 can use to select an optimized search model, such as the lexical search model 124, the semantic search model 126, or combined lexical-semantic search model 128, from the model registry 122, as discussed further herein.

The database 114 may include a vector database designed to store and manage user interaction embeddings 116, organizational rules 118, and organizational metadata 120, enabling the system 100 to support contextual query classification and personalized search result retrieval. The vector database is a specialized database for storing and indexing high-dimensional vectors to enable rapid retrieval based on similarity metrics, such as cosine similarity, for efficient query processing. It may be optimized for handling dense vectors, ensuring low-latency access to user interaction embeddings 116. The vector database may use data structures, such as Hierarchical Navigable Small World (HNSW) graphs or inverted file indices, to enable fast nearest-neighbor searches, allowing the query classification module 106 to quickly retrieve relevant user interaction embeddings 116 for a given search query. To support the computational demands of indexing and querying millions of high-dimensional vectors, the vector database may be deployed using hardware with significant processing power, such as multi-core CPUs or GPUs, facilitating rapid vector operations. For scalability, the vector database may be deployed on a distributed cluster using a cloud-based platform, enabling efficient storage and retrieval across large datasets, such as user-specific histories or enterprise-wide metadata 120, to support personalized searches tailored to user-specific preferences and/or organizational roles.

The semantic insight module 108 may be employed to analyze the query embeddings generated by the query classification module 106 to provide a deeper understanding of search query meaning and intent, enhancing the contextual classification used for search model selection. The semantic insight module 108 can enrich query embeddings with structured metadata 120, such as product category, product attributes, or organizational rules 118, from the database 114, ensuring the query's intent is accurately captured before routing by the dynamic routing engine 110. For example, for search queries such as "black fluorescent light" or "MN123 black" targeting a product database in the digital repository 130, the semantic insight module 108 may enrich the query embedding with organizational metadata 120 specifying the product category ("lighting"), attributes ("black color"), or the full manufacturer part ID ("MN12345" for "fluorescent light"), completing partial identifiers to clarify intent. The enriched query embeddings may be forwarded to the dynamic routing engine 110 for further processing.

The semantic insight module 108 may perform query embedding enrichment using a large language model (LLM), such as a transformer-based model, executed on a graphics processing unit (GPU) or tensor accelerator, for processing the query embedding to identify and incorporate relevant metadata 120. In some embodiments, the semantic insight module 108 may be implemented using one or more central processing unit (CPUs). The semantic insight module 108 can ensure the enriched embedding reflects nuanced user goals, such as seeking specific lighting products.

The semantic insight module 108 may employ natural language processing (NLP) techniques, such as named entity recognition (NER) and dependency parsing, to analyze query embeddings and align them with organizational metadata 120 and rules 118. For example, in an e-commerce context, NER can identify "MN123" as a partial manufacturer part ID and "black" as a color attribute, while dependency parsing can map relationships (e.g., "black" modifying "fluorescent light") to enrich the query embedding with metadata 120 like "lighting" category or rules 118 prioritizing specific vendors. In an enterprise setting, a query like "project management tools Q3" may be enriched with metadata 120 specifying "software updated in 2025" or rules 118 like "prioritize tools compatible with company workflows."

The dynamic routing engine 110 routes query embeddings to a search model from the model registry 122 for processing the query embeddings to retrieve search results from the digital repository 130. The dynamic routing engine 110 may select a search model from the model registry 122 that is optimized to process a particular query embedding based on its corresponding contextual classification, ensuring contextually relevant search results are retrieved from the digital repository 130. In some examples, the dynamic routing engine 110 may use the query contextual classification vector generated by the query classification module 106 to determine the most suitable search model-lexical search model 124, semantic search model 126, or combined lexical-semantic search model 128—for processing a query embedding based on the search query's intent and context. For example, for a search query such as "laptop i7 SSD" with a high keyword density, the dynamic routing engine 110 may select a lexical search model 124, while a vague query like "best computer for video editing" may select a semantic search model 126 to capture semantic intent. In some examples, the dynamic routing engine 110 may operate within the query processing module 104, leveraging cloud-based or distributed computing resources to perform high-speed model selection and query routing.

In some examples, to select an optimized search model optimized for processing a particular query embedding, the dynamic routing engine 110 can compute cosine similarities between the query contextual classification vector and reference vectors associated with the different search models stored in the model registry 122. These computations may be performed using optimized vector operations on GPUs or multi-core CPUs for low-latency model selection. For example, the lexical search model 124 may be associated with a keyword-based reference embedding. The dynamic routing engine 110 may calculate a cosine similarity between the query contextual classification vector and the keyword-based reference embedding to determine a keyword density score for the search query. The dynamic routing engine 110 may select the lexical search model 124 if the keyword density score exceeds a predefined keyword density threshold.

As another example, the semantic search model 126 may be associated with a semantic reference embedding. The dynamic routing engine 110 may calculate a cosine similarity between the query contextual classification vector and the semantic reference vector to determine semantic intent score. The dynamic routing engine 110 may select the semantic search model 126 if the semantic intent score exceeds a predefined semantic intent threshold.

As another example, the combined lexical-semantic search model 128 may be associated with a keyword-based reference embedding and a semantic reference embedding. The dynamic routing engine 110 may calculate a first cosine similarity between the keyword-based reference embedding and the query contextual classification vector to determine a keyword density score and a second cosine similarity between the semantic reference vector and the query contextual classification vector to determine semantic intent score. The dynamic routing engine 110 may select the combined lexical-semantic search model 128 if the keyword density score exceeds a predefined keyword density threshold and the semantic intent score exceeds a predefined semantic intent threshold.

The dynamic routing engine 110 enhances the system 100's ability to handle vague or context-dependent queries by dynamically selecting the most appropriate search model based on the query contextual classification vector. For example, a query like "MN123 black" with a partial product identifier may be routed to the combined lexical-semantic search model 128, which balances lexical matching of "MN123" with semantic interpretation of "black" as a color attribute, retrieving relevant fluorescent lights from a product database. The dynamic routing engine 110 may use cosine similarity metrics to ensure precise model selection, aligning with user intent and organizational constraints encoded in the classification vector, such as prioritizing sustainable vendors for a query like "project management tools" in an enterprise context. By routing queries to optimized search models, the dynamic routing engine 110 improves result relevance over traditional lexical search systems, enabling the system 100 to deliver contextually accurate results for e-commerce, enterprise, or other use cases.

The model registry 122 may store a plurality of search models. For example, the model registry 122 may store at least one lexical search model 124, at least one semantic search model 126, and at least one combined lexical-semantic search model 128, enabling the dynamic routing engine 110 to select an optimized model for each query. The model registry 122 may be implemented as a cloud-based database, using structured storage formats like SQL tables or NoSQL documents to index models by reference embeddings or vectors, supporting rapid retrieval and scalability. The model registry 122 can include more than three models, such as multiple variants of lexical search models 124 optimized for different languages or domains, multiple semantic search models 126 trained on diverse datasets, and/or multiple combined lexical-semantic search models 128 optimized for different domains and trained on diverse datasets, allowing the system 100 to handle a wide range of query types and contexts.

The lexical search model 124 can apply lexical matching to identify search results based on one or more keywords in the search query, suitable for queries with high keyword density. The lexical search model 124 may be implemented using inverted index structures, where keywords from the search query are mapped to listings in the digital repository 130 via term frequency-inverse document frequency (TF-IDF) weighting. For example, a query like "laptop i7 SSD" may be processed by tokenizing the terms and matching them to product descriptions, retrieving candidates results with exact or near-exact keyword alignments, executed on multi-core processors for efficient indexing and retrieval.

The semantic search model 126 may apply semantic similarity matching between the query embedding and candidate result embeddings to identify search results, suitable for queries requiring contextual interpretation. The semantic search model 126 may be implemented using transformer-based architectures, such as Sentence-BERT, to generate dense embeddings for query terms and product data, computing cosine similarities to rank results. For instance, a vague query like "affordable tech" may retrieve cost-effective electronics by matching semantic vectors, rather than exact keywords, running on GPUs for high-speed vector computations and handling implicit intent effectively. In some examples, the semantic search model 126 may be executing using one or more CPUs.

The combined lexical-semantic search model 128 can apply both lexical matching and semantic similarity matching to identify search results, effective for queries blending specific terms and implicit intent. The combined lexical-semantic search model 128 may be implemented as a combined system, integrating TF-IDF for lexical components with transformer embeddings for semantic analysis, using weighted fusion to balance scores. For example, a query like "project management tools Q3" may use lexical matching for "project management tools" and semantic matching for "Q3" to prioritize recent updates, executed on hybrid hardware (CPUs for lexical indexing, GPUs for embeddings) to optimize performance for diverse query types.

The dynamic routing engine 110 may route the query embedding to the selected search model via a routing mechanism, such as application programming interface (API) calls or message-passing protocols, ensuring integration of the dynamic routing engine 110 with the model registry 122. Once routed, the dynamic routing engine 110 can cause the selected search model to process the query embedding to retrieve candidate results from the digital repository 130. Processing the query embedding using the selected search model involves executing the selected search model to retrieve candidate results from the digital repository 130. Candidate results are initial search results for the query retrieved by the search model, such as product listings matching the query's criteria (e.g., laptops under 4500 for a "budget laptops" query), identified from one or more product databases within the digital repository 130. In some examples, execution of the selected search model may be performed using a graphics processing unit (GPU) or tensor accelerator. In some examples, execution of the selected search model may be performed using one or more central processing units (CPUs).

The digital repository 130 can serve as a centralized storage system for data from which search results are retrieved. The digital repository 130 may include various types of data corresponding to search results, such as, for example, product listings in a product database (e.g., e-commerce inventories with details like price, specifications, and availability), client interaction records in customer relationship management (CRM) systems (e.g., project details or contact information), technical documentation in knowledge bases (e.g., manuals or research articles), and/or enterprise hierarchies in organizational databases (e.g., department-specific product records).

The digital repository 130 may be implemented on scalable hardware, such as multi-node servers with high-capacity storage (e.g., solid-state drives for fast access or hard disk drives for large volumes), connected to the query processing module 104 and/or search models in the model registry 122 via high-speed networks (e.g., Ethernet or fiber optics) for optimized result retrieval. Data in the digital repository 130 may be structured using relational databases (e.g., SQL for product listings with tables for categories, attributes, and prices) or NoSQL formats (e.g., document-based for flexible metadata storage), enabling efficient querying by the optimized search model. The connection to the query processing module 104 and/or search models in the model registry 122 may be facilitated through APIs or direct database links, allowing the selected model to process query embeddings and retrieve candidate results with low latency, such as indexing product embeddings for cosine similarity comparisons during retrieval.

The feedback loop module 112 can dynamically adjust the ranking of retrieved candidate results based on user behavior and/or session history. In some examples, this adjustment may be performed in real time (e.g., real time adaptation) so that the ranking of candidate results dynamically changes as the user is submitting queries and scrolling through results. For example, as a user interacts with initial results for a "budget laptops" query at the user interface 102 by selecting low-cost items, the feedback loop module 112 may immediately re-rank remaining results to prioritize similar products, enhancing relevance within the same session. In some examples, the adjustment may be performed based on queries that the user has previously submitted and interacted with via the user interface 102.

The dynamic ranking adjustment may be executed by computing similarities between candidate result embeddings retrieved by the selected search model and the user interaction embeddings 116 stored in the database 114 to prioritize candidate results aligned with prior user preferences. An embedding-augmented re-ranking model may be employed. The embedding-augmented re-ranking module may include a machine learning model that integrates query embeddings with user interaction embeddings 116 to recalculate rank scores for candidate results. The embedding-augmented re-ranking model can combine lexical and semantic features from the optimized search model with contextual signals from user interaction embeddings 116, using a neural network (e.g., multi-layer perceptron) to compute weighted cosine similarities and adjust rankings. For example, for a candidate result embedding representing a laptop under 4500 and a user interaction embedding 116 encoding prior selections of budget electronics, the model computes a cosine similarity score, increasing the rank if the score exceeds a threshold (e.g., 0.8), ensuring results like affordable laptops are boosted based on user history.

The feedback loop module 112 collects user feedback related to search results presented via the user interface 102 by receiving session data and user interface logs from the user interface 102. The feedback loop module 112 can extract feedback parameters from these logs and data and generate user interaction embeddings 116 to be added to the database 114 based on the extracted feedback parameters. For example, upon displaying results for a "project management tools Q3" query, the module receives logs capturing clicks on software listings and session data showing dwell time on recent updates, extracting parameters like click-through rate or bounce rate to reflect user satisfaction with the results.

The feedback loop module 112 can generate user interaction embeddings 116 by extracting numerical feedback parameters from user interface logs and session data, normalizing these features, and encoding them using a neural network. Parameters like bounce rate (percentage of sessions exiting without interaction), dwell time (time spent on a result), click-through rate (percentage of results clicked), and other numerical features (e.g., cart addition count) may be extracted by parsing JSON-formatted logs using rule-based scripts or machine learning classifiers (e.g., support vector machines for classifying click events). The feedback loop module 112 and user interface 102 may be coupled via real-time communication protocols, such as WebSockets for continuous data streaming or API endpoints for batch transfers, ensuring session data (e.g., JSON records of clicks) and logs (e.g., event timestamps) are sent immediately upon interaction. Normalization can scale features to a standard range (e.g., min-max scaling for dwell time from 0 to 1), preventing bias from varying scales. Encoding may be performed using a neural network, such as an autoencoder, to compress normalized features into n-dimensional user interaction embeddings 116. Additionally, or alternatively, feedback loop module 112 may employ principal component analysis (PCA) for dimensionality reduction or graph neural networks for relational data.

The feedback loop module 112 may update the database 114 by appending additional user interaction embeddings 116 to an append-only memory segment and updating a locality-sensitive hash (LSH) table using an incremental indexing operation. The append-only segment can ensure immutable storage of the user interaction embeddings 116, maintaining historical integrity while allowing new data (e.g., from a "budget laptops" query session) to be added without overwriting existing entries. The LSH table may be updated incrementally by hashing new user interaction embeddings 116 into buckets based on their approximate similarity, using random projections or hyperplanes to enable fast nearest-neighbor searches for future queries. For example, after a user interacts with results (e.g., high dwell time on affordable electronics), the new user interaction embedding 116 may appended and hashed, updating the LSH table to reflect the preference without reindexing the entire database 114, executed on GPUs for efficient hashing operations.

The database 114 may be managed by the feedback loop module 112 to ensure user-specific storage of feedback-derived user interaction embeddings 116 associated with a single user or class of users, enabling dynamic adjustment of results personalized to that user or class. The vector database within the database 114 may employ partitioning techniques, such as sharding based on user IDs or class identifiers (e.g., "marketing team"), to isolate user interaction embeddings 116 for individual users or groups, preventing cross-user data leakage. For example, user interaction embeddings 116 from a user's frequent budget electronics selections may be stored in a user-specific shard, while department-level embeddings (e.g., marketing team preferences for creative software) may be aggregated in a class shard. The feedback loop module 112 can manage this by embedding user/class identifiers in feedback parameters during extraction, ensuring user interaction embeddings 116 are indexed accordingly. This personalization allows the query classification module 106 to retrieve user-specific embeddings 116 for tailoring classification vectors, resulting in results prioritized for the user or class.

The feedback loop module 112 may perform real-time functions (collecting feedback, updating user interaction embeddings 116, dynamically adjusting results) by using streaming data pipelines and in-memory caching, allowing results presented to the user to be dynamically adjusted in the same session. Post-query interaction data may be continuously converted to user interaction embeddings 116 by the feedback loop module 112 and used for result reranking via low-latency updates to the database 114. For example, results presented to the user may adjust as the user is scrolling through the results (e.g., adding one result to a cart may boost the ranking of other candidate results, bounce rate or query revisions may adjust the ranking of candidate results, etc.). The feedback loop module 112 may employ event-driven architectures for streaming logs from the user interface 102, processing them with real-time encoders (e.g., neural networks on GPUs) to generate user interaction embeddings 116, and updating an in-memory cache (e.g., Redis) for immediate reranking without full database writes.

In some examples, the feedback loop module 112 may generate a prompt to be presented via the user interface 102 that asks the user to provide explicit user feedback. For example, the feedback loop module 112 may monitor user session data and identify that a dwell time threshold has been exceeded, or a bounce rate has been exceeded, and based on exceeding the threshold, the feedback loop module 112 may generate a prompt asking the user to provide feedback regarding the relevance of the presented results. The feedback loop module 112 may employ threshold-based triggers, implemented as conditional scripts in the user interface 102 (e.g., JavaScript monitoring dwell time>30 seconds), to detect indicators like high bounce rate, sending an event to the feedback loop module 112 via API. The feedback loop module 112 can then generate a JSON-formatted prompt template, customized with query context (e.g., "Were these laptops relevant to your 'budget gaming' search?"), and render it as a pop-up or inline form on the user interface 102.

The prompt generated by the feedback loop module 112 may request explicit feedback such as rating results (e.g., "rate this laptop result on a scale of 1-5"), confirming relevance (e.g., "is this product relevant to your query?" with yes/no buttons), or identifying non-relevant results (e.g., "mark as irrelevant" checkboxes). The user interface 102 may present the prompt as a pop-up modal after a dwell time threshold, an inline form embedded in the results page (e.g., next to each result), or a sidebar survey with sliders/radio buttons for ratings. Interface elements like buttons, checkboxes, or sliders collect feedback via event handlers (e.g., JavaScript onclick events), transmitting responses to the feedback loop module 112 as JSON data. The feedback loop module 112 can extract parameters (e.g., rating score as a numerical feature), normalize the parameters (e.g., scale to 0-1), and encode the normalized parameters as user interaction embeddings 116 using a neural network, such as an autoencoder, to capture explicit relevance signals for future personalization.

The feedback loop module 112 may employ a feedback augmented retrieval re-ranker (FARR) to re-rank candidate results based on user interaction embeddings 116 from explicit or implicit feedback, integrating lexical and semantic weights with learned contextual relevance. The FARR may be a machine learning model that fuses query embeddings with user interaction embeddings 116 using a multi-head attention mechanism in a transformer architecture, recalculating rank scores by computing weighted cosine similarities between candidate result embeddings and user interaction embeddings 116. For example, implicit feedback (e.g., high dwell time on budget laptops) can increase weights for similar results, while explicit feedback (e.g., "irrelevant" rating) can reduce weights. In some examples, the FARR may be executed on GPUs for real-time reranking. In some examples, the FARR may be executed on one or more CPUs. Real-time reranking can enable the FARR to dynamically prioritize results aligned with user preferences.

The feedback loop module 112 may retrieve and use organizational rules 118 from the database 114 to enhance filtering and ranking of candidate results by applying rule-based constraints during reranking. For example, organizational rules 118 such as "prioritize sustainable products" may be retrieved as vectors or text strings and integrated into the FARR model via weighted scoring, reducing ranks for non-compliant results (e.g., non-sustainable laptops in a "budget laptops" query). Technically, the feedback loop module 112 may query the database 114 using SQL or NoSQL commands to fetch organizational rules 118 matching the query context, embed the organizational rules 118 using a transformer model, and fuse the embedded organizational rules 118 with user interaction embeddings 116 in the reranking process, ensuring results align with organization policies.

The feedback loop module 112 may detect that a user is modifying a query shortly after being presented results or may detect that the system is returning zero or irrelevant search results, and may reroute the query back to the query classification module 106 for reclassification (e.g., regeneration of the contextual classification vector). The rerouted query may be reclassified based on updated user interaction embeddings 116 to enhance classification accuracy so that the search can be rerouted to an optimized model and improved search results may be retrieved. Detection of these events may be implemented by monitoring session data for thresholds, such as query refinement within 10 seconds of result display or zero results returned, triggering an event to the feedback loop module 112 via API. The feedback loop module 112 updates user interaction embeddings 116 with the negative feedback (e.g., bounce rate) and signals the query classification module 106 to regenerate the query classification vector using the latest user interaction embeddings 116, enabling the dynamic routing engine 110 to select a different model (e.g., semantic search model 126 for vague queries), retrieving improved results from the digital repository 130.

In some embodiments, the hardware architecture of the system 100 may be implemented as a cloud-based distributed system, where the query processing module 104 and its submodules are deployed as containerized microservices on a scalable cloud platform. These microservices may be individual, self-contained units of software that perform specific functions and communicate via defined interfaces, allowing for independent scaling and updates. The platform may employ orchestration tools, which are software frameworks for managing containerized applications, to enable automatic scaling and load balancing, ensuring resources are allocated dynamically based on demand. Components of the system 100 may be interconnected through a virtual private network, a secure, isolated network environment, with API gateways for secure communication, supported by multi-region replication for high availability and data redundancy, where data is duplicated across geographic locations to prevent loss.

In some embodiments, the vector database 114 may be deployed on cloud-managed services optimized for vector indexing, connected to the query processing module 104 via low-latency API calls over secure communication protocols, enabling real-time retrieval of user interaction embeddings 116.

In some embodiments, the model registry 122 is implemented as a cloud object storage service, which provides scalable storage for files with metadata tagging for model versions, communicably coupled to the dynamic routing engine 110 through efficient remote procedure call protocols for model loading.

In some embodiments, the digital repository 130, such as a product database, is deployed on cloud relational databases, which manage structured data with tables and relationships, or NoSQL stores, which handle flexible, unstructured data, linked to the query processing module 104 via database connection drivers for query execution.

In some embodiments, the system 100 may include on-premise deployments using dedicated servers with multi-core CPUs and GPUs for the query processing module 104 and its submodules, connected via local Ethernet networks, which provide high-speed wired connectivity within a facility.

In some embodiments, the system 100 may include a hybrid setups that combines on-premise hardware for sensitive data (e.g., vector database 114) with cloud services for scalable computation (e.g., model registry 122). For on-premise setups, the digital repository 130 may be employed as a local relational database server, coupled to the dynamic routing engine 110 through internal APIs, while the feedback loop module 112 may employ local message queues, which are software systems for asynchronous communication between components, for user interaction data processing. These alternatives allow flexibility for environments with data sovereignty requirements.

The hardware architecture of the system 100 provided herein can achieve significant technological advantages for dynamic context-driven search routing and retrieval by enabling real-time, scalable processing of query embeddings and user interaction embeddings 116, ensuring low-latency model selection and result ranking. Cloud-based microservices can allow the dynamic routing engine 110 to instantly route queries to optimized search models in the model registry 122, while using distributed indexing for the database 114 supports fast retrieval of feedback-derived embeddings for personalized contextual classification. Hybrid or on-premise options ensure adaptability to varying computational demands, reducing downtime and enhancing efficiency in handling vague queries, ultimately improving user experience through precise feedback-adapted search results.

Figure 2:
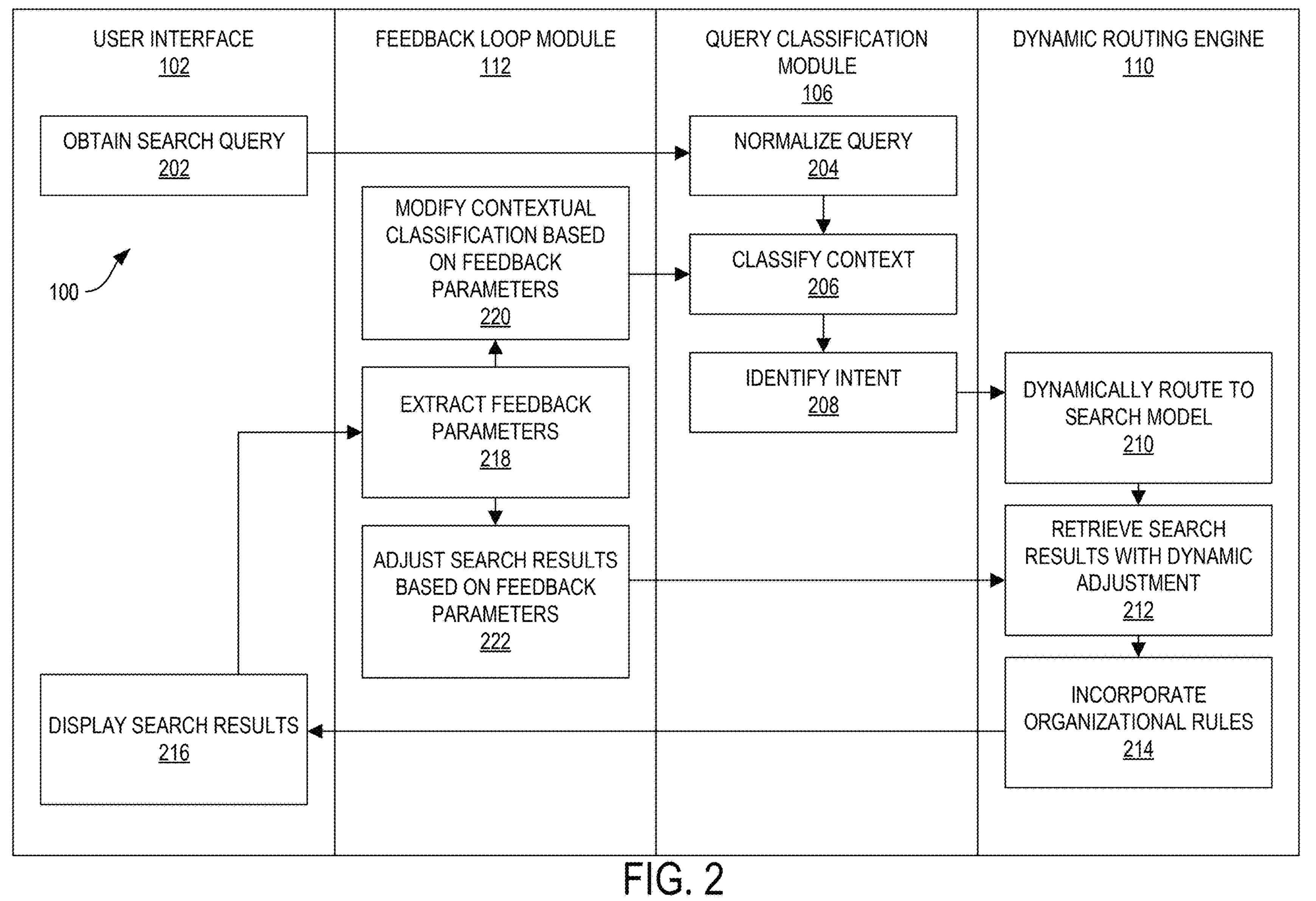
FIG. 2 is a flow diagram illustrating an embodiment of a method for dynamic context-based search.

FIG. 2 is a swim lane flow diagram illustrating an embodiment of a method 200 for dynamic context-based search. The method 200 may be implemented using the system 100. Any aspects of the system 100 and/or method 200 may be combined with any of the other embodiments of the system and/or method disclosed herein, and vice versa.

According to the method 200, the user interface 102 obtains 202 a search query. The user interface 102 may be a web interface executed on a remote device of the user. The user interface 102 can receive queries in formats such as text-based natural language phrases, keywords, numerals like product serial numbers, or combinations thereof, which may target product databases or other digital repositories. For example, a query like "budget laptops for gaming" can be entered via a text field, while a voice-activated assistant may capture spoken queries like "show me recent project management software" using natural language processing (NLP) techniques. Structured forms can allow filter selection for refinement, such as price range or release date, ensuring the query captures user intent like preferences for cost-effective electronics. The user interface 102 may communicate the query to the query processing module 104 via secure API calls over a network, enabling further processing while supporting diverse input methods for e-commerce or enterprise use cases.

According to the method 200, the query classification module 106 normalizes 204 the query. The query classification module 106 can standardize the query by converting text to lowercase, removing punctuation, and correcting spelling errors, ensuring consistency across similar intents. It may employ rule-based tokenization to break the query into components, such as "budget," "gaming," and "laptops," facilitating semantic analysis. Semantic enrichment using a large language model (LLM) on a GPU can incorporate synonyms or relationships, enhancing the query's contextual representation. This normalization can reduce syntactic variability, allowing the transformer-based model to focus on intent, such as economical gaming hardware, for accurate embedding generation.

According to the method 200, the query classification module 106 classifies 206 the query context. As part of classifying the query context, the query classification module may generate a query embedding for the query using a transformer-based embedding model, representing the query as an n-dimensional numeric vector to capture its semantic content. The module can aggregate the query embedding with retrieved user interaction embeddings 116 from the database 114, which encode prior user preferences, along with organizational metadata 120 and query parameters. The query classification module 106 may utilize a RAG-based model (e.g., with dual-encoder architecture on GPUs) to retrieve relevant data, applying rule-based weighting to prioritize user interaction embeddings 116 aligned with the query's intent. For example, for a "project management tools Q3" query, the query classification module 106 may classify the context to emphasize recent software, incorporating enterprise metadata for prioritization.

According to the method 200, the query classification module 106 may identify 208 an intent category for the query. The query classification module 106 can personalize the contextual classification vector using hierarchical user data from organizational metadata 120, such as user-specific history from user interaction embeddings 116 or department-level preferences. For instance, a "budget laptops" query may be categorized as cost-focused based on user interaction embeddings 116 indicating prior low-cost selections, while "project management tools Q3" is categorized as enterprise-focused, reflecting a project manager's role, to guide model selection by the dynamic routing engine 110.

According to the method 200, the dynamic routing engine 110 dynamically routes 210 the query to a search model optimized for the query. The dynamic routing engine 110 can use the contextual classification vector to select a lexical, semantic, or combined lexical-semantic model from the model registry 122, routing the query embedding via API calls or message-passing protocols. For example, queries with high keyword density like "laptop i7 SSD" may route to the lexical search model 124, while vague queries like "best computer for video editing" route to the semantic search model 126, ensuring efficient integration with the registry for context-aligned processing. Queries with both high keyword density and semantic intent, such as "budget gaming laptops under 4500 with SSD," may route to the combined lexical-semantic search model 128, balancing exact term matching with contextual understanding.

According to the method 200, the dynamic routing engine 110 retrieves 212 search results from the digital repository 130 using selected search model. The dynamic routing engine may dynamically adjust the ranking and/or retrieval of search results based on user interaction embeddings 116 that encode feedback parameters derived from user interactions with prior search results. The selected search model can process the query embedding to retrieve candidate results from the digital repository 130, such as product listings, using similarities with repository data. The feedback loop module 112 may adjust rankings in real time by computing similarities with user interaction embeddings 116, boosting results aligned with preferences (e.g., low-cost laptops). In some examples, this can occur on GPUs for low-latency, ensuring contextually relevant retrieval. In some example, this can occur on one or more CPUs.

According to the method 200, the dynamic routing engine 110 may incorporate 214 organizational rules. The dynamic routing engine 110 can retrieve organizational rules 118 from the database 114, applying constraints like "prioritize sustainable products" during retrieval or ranking. Rules may be fused with query embeddings using transformer models, ensuring results align with enterprise policies. Incorporation of organizational rules may be executed via database queries. Incorporating organizational rules may adjust retrieved results by filtering or re-ranking candidates to comply with constraints.

According to the method 200, the user interface 102 displays 216 search results. Results can be presented as detailed reports or interactive dashboards with charts and images, listing details like price, availability, product attributes, lead times, product images, suppliers, etc. Users may interact with the displayed results by scrolling through listings to view additional items, selecting a result to access detailed information (e.g., specifications or reviews), adding items to a cart for purchase, or navigating away to refine the query or exit the session. The user interface 102 may use HTML and JavaScript to render dynamically, organizing by context like prioritizing budget items.

According to the method 200, the feedback loop module 112 extracts 218 feedback parameters based on user interaction with the search results at the user interface 102. The feedback loop module 112 can receive session data and logs from the user interface 102, capturing interactions like dwell time or query refinement, parsing JSON logs with rule-based scripts to extract numerical features (e.g., bounce rate). Feedback parameters may be extracted by analyzing logs for metrics such as click-through rate (counting clicks vs. impressions) or dwell time (timing from result load to action), using classifiers to categorize events. User interaction embeddings 116 may be generated by normalizing features (e.g., scaling dwell time to 0-1) and encoding with a neural network like an autoencoder to compress data into vectors.

According to the method 200, the feedback loop module 112 may modify 220 the contextual classification based on extracted feedback parameters. The feedback loop module 112 can update user interaction embeddings 116 in the database 114 and trigger the query classification module 106 to regenerate the classification vector based on the updated user interaction embeddings 116. For example, the feedback loop module 112 may trigger refinement after a high bounce rate for a search query. Modifying the contextual classification vector can improve retrieved results by refining intent understanding, potentially changing model routing (e.g., from lexical to semantic for vague queries), leading to retrieval of more relevant candidates from the digital repository 130. This provides a technical improvement over prior approaches by enabling adaptive, feedback-driven classification, reducing irrelevant results and enhancing efficiency through real-time intent refinement.

According to the method 200, the feedback loop module 112 can adjust 222 retrieval of search results based on the extracted feedback parameters. For example, using an embedding-augmented re-ranking model, the feedback loop module 112 can recompute similarities between candidate result embeddings and updated user interaction embeddings 116, boosting rankings of results aligned with user preferences encoded by the extracted feedback parameters. Reranking may be executed on one or more GPUs or CPUs. Reranking executed on one or more GPUs can ensure dynamic adaptation as users interact. Result retrieval may be adjusted by incorporating feedback into user interaction embeddings 116, enabling reranking to prioritize user preferences. This improves presented results by filtering irrelevant items, enhancing relevance via real-time updates. Dynamic adaptation may include adjusting retrieved search results in real-time as the user is interacting with the results, e.g., cart addition boosts similar items, or bounce rate downgrades categories, providing a technical improvement over prior static systems by reducing manual refinements and improving user experience through personalized, adaptive retrieval.

Figure 3:
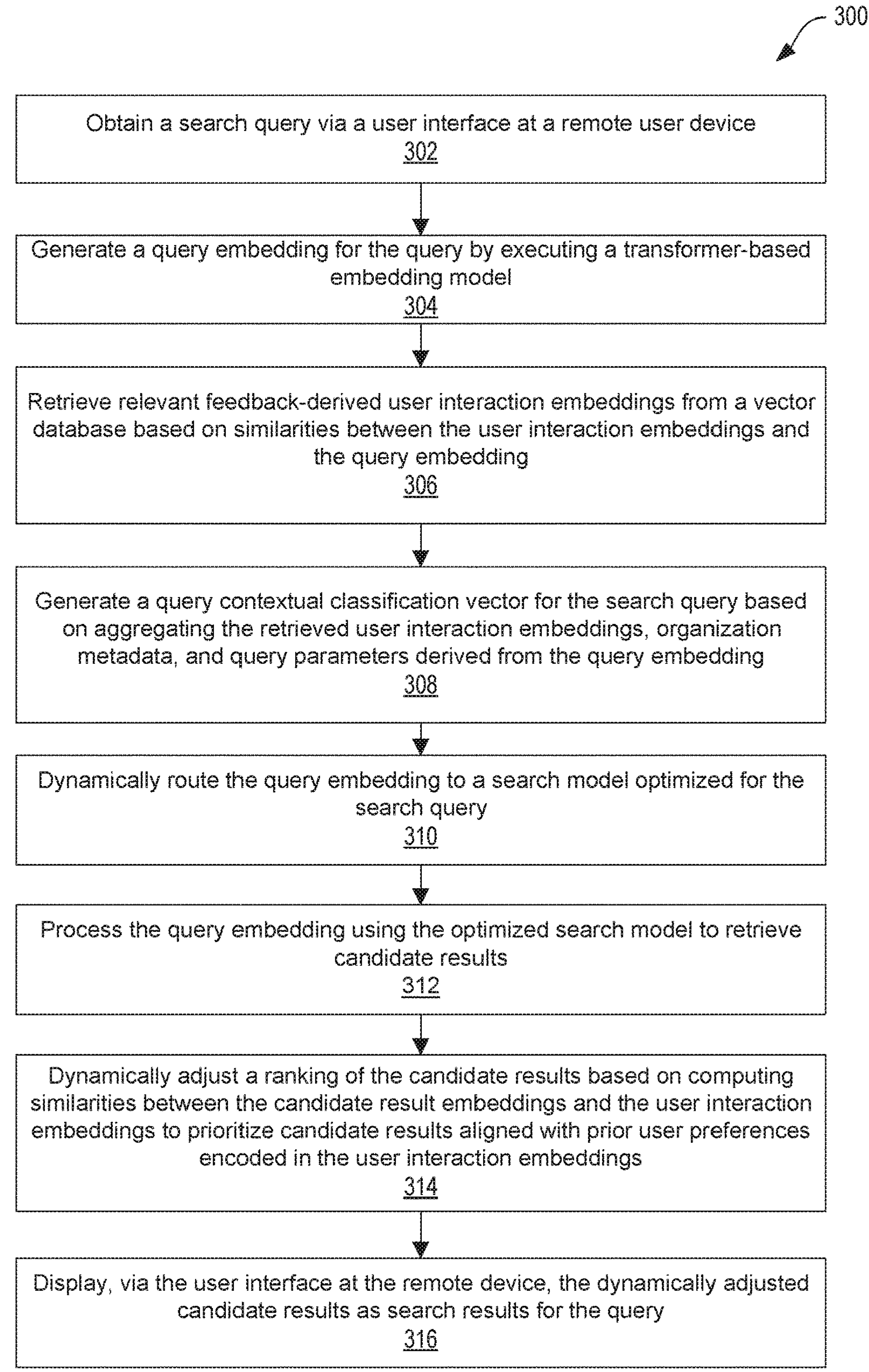
FIG. 3 is a flow diagram illustrating an embodiment of a method for dynamic context-based search.

FIG. 3 is a flow diagram illustrating an embodiment of a method 300 for dynamic context-based search. The method 300 may be implemented using the system 100. Any aspects of the system 100 and/or method 300 may be combined with any of the other embodiments of the system and/or method disclosed herein, and vice versa.

In one embodiment, the method 300 includes obtaining 302 a search query via a user interface at a remote user device. The method further includes generating 304 a query embedding for the query by executing a transformer-based embedding model. The query embedding represents the search query as an n-dimensional numeric vector. The method further includes retrieving 306 relevant feedback-derived user interaction embeddings from a vector database based on similarities between the user interaction embeddings and the query embedding. The user interaction embeddings encode feedback parameters extracted from user interface logs and session data for user interface interactions with search results of prior queries. The method further includes generating 308 a query contextual classification vector for the search query based on aggregating the retrieved user interaction embeddings, organization metadata, and query parameters derived from the query embedding. The method further includes dynamically routing 310 the query embedding to a search model optimized for the search query. The optimized search model is selected from a model registry stored in the memory using the query contextual classification vector. The method further includes processing 312 the query embedding using the optimized search model to retrieve candidate results and dynamically adjusting 314 a ranking of the candidate results based on computing similarities between the candidate result embeddings and the user interaction embeddings to prioritize candidate results aligned with prior user preferences encoded in the user interaction embeddings. The method further includes displaying 316, via the user interface at the remote device, the dynamically adjusted candidate results as search results for the query.

In another embodiment, the method 300 includes selecting the search model from a lexical search model, a semantic search model, or a combined lexical-semantic search model stored in the model registry.

In another embodiment, the method 300 includes selecting the lexical search model by computing a cosine similarity between the query embedding and a keyword-based reference embedding in the model registry to determine a keyword density score above a keyword density threshold in the search query.

In another embodiment, the method 300 includes selecting the semantic search model by computing a cosine similarity between the query contextual classification vector and a semantic reference vector in the model registry to determine a semantic intent score above a semantic intent threshold.

In another embodiment, the method 300 include selecting the combined lexical-semantic search model by computing a first cosine similarity between the query embedding and a keyword-based reference embedding to determine a keyword density score above a keyword density threshold and a second cosine similarity between the query contextual classification vector and a semantic reference vector to determine a semantic intent score above a semantic intent threshold.

In another embodiment, the method 300 includes monitoring post-query user interactions to generate an additional interface log and additional session data for the search query, extracting additional feedback parameters from the additional interface log and additional session data, and updating the vector database to include additional user interaction embeddings generated based on the additional feedback parameters.

In another embodiment of the method 300, extracting the additional feedback parameters from the additional interface log and additional session data includes extracting numerical features including one or more of a click-through rate, a dwell time, a bounce rate, and result selection data.

In another embodiment, the method 300 includes normalizing the numerical features and encoding the normalized numerical features as the additional user interaction embeddings using a neural network.

In another embodiment, the method 300 includes updating the vector database by appending the additional user interaction embeddings to an append-only memory segment of the vector database and updating a locality-sensitive hash (LSH) table using an incremental indexing operation.

In another embodiment of the method 300, the vector database is user-specific, storing feedback-derived user interaction embeddings associated with a single user or class of users.

In another embodiment, the method 300 includes adjusting the user interaction embeddings based on a negative feedback indicator by recomputing cosine similarities to reduce weights of embeddings associated with non-selected results. The negative feedback indicator may include at least one of a cart abandonment or absence of product selection within a dwell time threshold.

In another embodiment, the method 300 includes prompting the collection of explicit user feedback on search result relevance after a dwell time threshold and storing the explicit feedback as a user interaction embedding in the vector database.

In another embodiment, the method 300 includes preprocessing the search query to produce a normalized query for input to the transformer-based embedding model. The preprocessing may include tokenizing the search query using rule-based logic and performing semantic enrichment using a large language model (LLM) executed on a graphics processing unit (GPU) or tensor accelerator.

In another embodiment, the method 300 includes executing a retrieval-augmented classification using a retrieval-augmented generation (RAG)-based model to retrieve the relevant user interaction embeddings and the organizational metadata from the vector database and applying rule-based weighting to compute a cosine similarity between the query embedding and the retrieved user interaction embeddings.

In another embodiment, the method 300 includes executing, by a search execution module, the selected search model to identify candidate results from one or more product databases.

In another embodiment of the method 300, dynamically adjusting the ranking of the candidate results includes include a candidate rank score of a candidate result associated with a user interaction embedding indicative of a prior product selection.

In another embodiment of the method 300, the user interface logs and session data include one or more of result selection data, query refinement data, clickstream logs, bounce rate data, product return logs, dwell time data, scroll depth data, pointer trajectory sampling, and click sequence timing data.

In another embodiment of the method 300, determining the query contextual classification vector includes personalizing the query contextual classification vector based on hierarchical user data including at least one of user-specific history, department-level history, or enterprise-level history retrieved from the vector database.

In another embodiment of the method 300, generating the query embedding includes enriching the query embedding with structured metadata including at least one of product category, product attributes, or organizational rules before selecting the search model.

The method 300 described in FIG. 3 may be implemented by the system 100, as described herein. With reference now to FIG. 3 in conjunction with FIG. 1, according to one embodiment of the method 300, the user interface 102 obtains 302 a search query at a remote user device. The query classification module 106 generates 304 a query embedding for the query by executing a transformer-based embedding model, the query embedding representing the search query as an n-dimensional numeric vector. The query classification module 106 retrieves 306 relevant feedback-derived user interaction embeddings 116 from a vector database 114 based on similarities between the user interaction embeddings and the query embedding. The user interaction embeddings 116 encode feedback parameters extracted from user interface logs and session data for user interface interactions with search results of prior queries. The query classification module 106 generates 308 a query contextual classification vector for the search query based on aggregating the retrieved user interaction embeddings 116, organization metadata 120, and query parameters derived from the query embedding. The dynamic routing engine 110 dynamically routes 310 the query embedding to a search model optimized for the search query. The optimized search model is selected from a model registry 122 stored using the query contextual classification vector. The dynamic routing engine 110 processes 312 the query embedding using the optimized search model to retrieve candidate results. The feedback loop module 112 dynamically adjusts 314 a ranking of the candidate results based on computing similarities between the candidate result embeddings and the user interaction embeddings to prioritize candidate results aligned with prior user preferences encoded in the user interaction embeddings. The user interface 102 displays the dynamically adjusted candidate results as search results for the query.

In another embodiment, the dynamic routing engine 110 selects the search model from a lexical search model 124, a semantic search model 126, or a combined lexical-semantic search model 128 stored in the model registry.

In another embodiment, the dynamic routing engine 110 selects the lexical search model 124 by computing a cosine similarity between the query embedding and a keyword-based reference embedding in the model registry to determine a keyword density score above a keyword density threshold in the search query.

In another embodiment, the dynamic routing engine 110 selects the semantic search model 126 by computing a cosine similarity between the query contextual classification vector and a semantic reference vector in the model registry to determine a semantic intent score above a semantic intent threshold.

In another embodiment, the dynamic routing engine 110 selects the combined lexical-semantic search model 128 by computing a first cosine similarity between the query embedding and a keyword-based reference embedding to determine a keyword density score above a keyword density threshold and a second cosine similarity between the query contextual classification vector and a semantic reference vector to determine a semantic intent score above a semantic intent threshold.

In another embodiment, the user interface 102 monitors post-query user interactions to generate an additional interface log and additional session data for the search query, the feedback loop module 112 extracts additional feedback parameters from the additional interface log and additional session data, and the feedback loop module 112 updates the vector database to include additional user interaction embeddings generated based on the additional feedback parameters.

In another embodiment, the feedback loop module 112 extracts numerical features including one or more of a click-through rate, a dwell time, a bounce rate, and result selection data.

In another embodiment, the feedback loop module 112 normalizes the numerical features and encodes the normalized numerical features as the additional user interaction embeddings using a neural network.

In another embodiment, the feedback loop module 112 updates the vector database by appending the additional user interaction embeddings to an append-only memory segment of the vector database and updating a locality-sensitive hash (LSH) table using an incremental indexing operation.

In another embodiment, the vector database is user-specific, storing feedback-derived user interaction embeddings associated with a single user or class of users.

In another embodiment, the feedback loop module 112 adjusts the user interaction embeddings based on a negative feedback indicator by recomputing cosine similarities to reduce weights of embeddings associated with non-selected results. The negative feedback indicator may include at least one of a cart abandonment or absence of product selection within a dwell time threshold.

In another embodiment, the feedback loop module 112 prompts the collection of explicit user feedback on search result relevance after a dwell time threshold and stores the explicit feedback as a user interaction embedding in the vector database.

In another embodiment, the query classification module 106 preprocesses the search query to produce a normalized query for input to the transformer-based embedding model. The preprocessing may include tokenizing the search query using rule-based logic and performing semantic enrichment using a large language model (LLM) executed on a graphics processing unit (GPU) or tensor accelerator.

In another embodiment, the query classification module 106 performs a retrieval-augmented classification using a retrieval-augmented generation (RAG)-based model to retrieve the relevant user interaction embeddings and the organizational metadata from the vector database and applies rule-based weighting to compute a cosine similarity between the query embedding and the retrieved user interaction embeddings.

In another embodiment, the candidate results are retrieved from the digital repository 130, and the digital repository includes one or more product databases.

In another embodiment, the feedback loop module 112 dynamically adjusts the ranking of the candidate by increasing a candidate rank score of a candidate result associated with a user interaction embedding indicative of a prior product selection.

In another embodiment of the method 300, the user interface logs and session data include one or more of result selection data, query refinement data, clickstream logs, bounce rate data, product return logs, dwell time data, scroll depth data, pointer trajectory sampling, and click sequence timing data.

In another embodiment, determining the query contextual classification vector includes personalizing, by the query classification module 106, the query contextual classification vector based on hierarchical user data including at least one of user-specific history, department-level history, or enterprise-level history retrieved from the vector database.

In another embodiment, the semantic insight module 108 enriches the query embedding with structured metadata including at least one of product category, product attributes, or organizational rules before selecting the search model.

Figure 4:
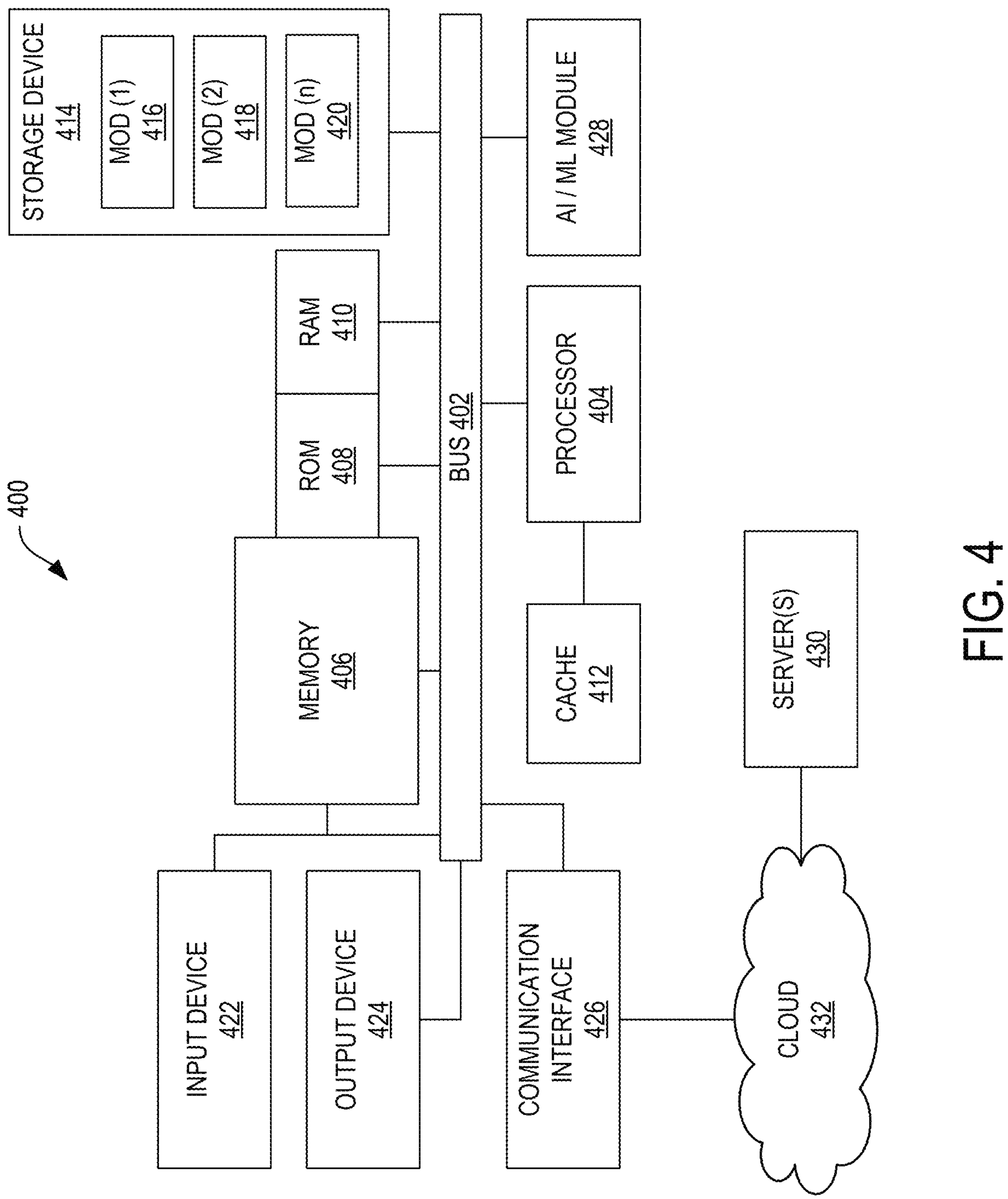
FIG. 4 illustrates an embodiment of a computing hardware environment for a dynamic context-based search system.

FIG. 4 illustrates embodiment of a hardware environment of a computing system 400 for cloud resource deployment. The hardware environment of the computing system 400 is optimized for implementing the complex operations for dynamic context-based search system as described above in connection with FIGS. 1-3, integrating both a robust, modular hardware setup and a detailed processor-based computing system. With reference back to FIG. 4, the components of the hardware environment of the computing system 400 are in communication with each other using a system bus 402. The computing system 400 can include a processing unit 404 (CPU or processor) and the system bus 402 that may couple various system components including the system memory 406, such as a read only memory 408 (ROM) and a random-access memory 410 (RAM), to the processor 404. The computing system 400 can include a cache 412 of high-speed memory connected directly with, in close proximity to, or integrated as part of the processor 404.

The computing system 400 can copy data from the system memory 406, ROM 408, RAM 410, and/or a storage device 414 to the cache 412 for quick access by the processor 404. In this way, the cache 412 can provide a performance boost that avoids processor delays while waiting for data. These and other modules can control the processor 404 to perform various actions. Other system memory 406 may be available for use as well. The system memory 406 can include multiple different types of memory with different performance characteristics. The processor 404 can include any general-purpose processor and a hardware module or software module, such as module (1) 416, module (2) 418, up to module (n) 420 (where n is an integer greater than 2) stored in the storage device 414, to control the processor 404 as well as a special-purpose processor where software instructions are incorporated into the actual processor design. The processor 404 may essentially be a completely self-contained computing system, containing multiple cores or processors, a system bus, memory controller, cache, etc. A multi-core processor may be symmetric or asymmetric.

To enable user interaction with the computing system 400, an input device 422 can represent any number of input mechanisms, such as a microphone for speech, a touch-protected screen for gesture or graphical input, keyboard, mouse, motion input, speech and so forth. An output device 424 can also be one or more of a number of output mechanisms known to those of skill in the art. In some instances, multimodal systems can enable a user to provide multiple types of input to communicate with the computing system 400. The communications interface 426 can govern and manage the user input and system output. There may be no restriction on operating on any particular hardware arrangement and therefore the basic features here may easily be substituted for improved hardware or firmware arrangements as they are developed.

The storage device 414 can be a non-volatile memory and can be a hard disk or other types of computer readable media or storage which can store data that are accessible by a computer, such as magnetic cassettes, flash memory cards, solid state memory devices, digital versatile disks, cartridges, random access memory, read only memory, and hybrids thereof.

As discussed above, the storage device 414 can include the software modules 416, 418, 420 for controlling the processor 404. Other hardware or software modules are contemplated. The storage device 414 can be connected to the system bus 402. In some embodiments, a hardware module that performs a particular function can include a software component stored in a computer-readable medium in connection with the necessary hardware components, such as the processor 404, the system bus 402, the output device 424, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIG. 1 and FIG. 4, the disclosed system 100 can operate within a sophisticated, processor-based computing environment, exemplified by the computing system 400, designed to orchestrate, optimize, and secure dynamic context-based search operations with real-time precision. Central to the system 100 is a high-performance processor 404, which coordinates essential functions across memory, storage, data inputs, and external networks via a system bus 402. Equipped with a dedicated cache 412, the processor 404 ensures rapid access and retrieval of critical data, minimizing latency and providing the computational capacity to process complex instructions related to dynamic context-based searches.

The computing system 400 includes a multi-tiered memory architecture where the system memory 406 includes the ROM 408 and the RAM 410. One aspect of the computing system 400 is its multi-layered storage infrastructure, anchored by the storage device 414. This storage device 414 includes various forms of non-volatile memory, such as solid-state drives (SSDs) and magnetic storage, housing critical data and software modules 416, 418, 420 necessary for controlling the processor 404 and executing operations described in FIG. 1-3, for example. The storage device 414 stores complex software algorithms and machine learning models that analyze historical data and real-time conditions, generating optimized task sequences for performing the method 200 and/or the method 300, for example.

This configuration supports high-speed processing for tasks and data updates essential for dynamic operations for cloud resource cloning. While the ROM 408 provides core operational protocols and configurations, the high-speed RAM 410 enables the system to handle real-time updates to inventory levels, task queues, and predictive analytics. Furthermore, the storage device 414, including SSDs and magnetic storage, houses data and software modules necessary for executing the functions described in conjunction with FIGS. 1-3. This storage system retains historical records, operational data, and machine learning models, enabling complex task sequencing and optimized data management.

Artificial intelligence (AI) and machine learning (ML) modules 428 may be embedded within the computing system 400 to enable advanced predictive analytics, transforming historical and real-time data into actionable insights. High-performance Tensor Processing Units (TPUs) and Graphical Processing Unites (GPUs), and Central Processing Units (CPUs) support continuous training of AI/ML models that enhance classification, routing, and retrieval functions. AI-driven algorithms analyze real-time operational data to allow the system 400 to adjust tasks proactively. These AI/ML models 428 are housed on cloud servers 430, enabling parallel processing and providing adaptive, scalable insights across cloud resources or cloud service providers.

Leveraging TPUs, GPUs, and CPUs, the system 400 continuously trains the AI/ML models 428 that improve dynamic context-based searches. AI-driven algorithms analyze real-time operational data to enable the system 400 to proactively adjust task allocations and priorities. The AI/ML models 428 are housed on cloud servers 430, where large datasets can be processed in parallel, providing scalable, adaptive insights to each cloud resource.

A suite of data collection and input/output (I/O) devices may be employed to monitor and interact with the user interface 102. The input devices 422, including barcode scanners, RFID readers, IoT sensors, touchscreens, and handheld devices. This data feeds into the processor 404 for seamless integration into the operational database, enabling precise, on-the-fly adjustments. The output devices 424, such as digital displays, wearable alerts, and screens, provide real-time feedback to users. The range of input and output devices, including the input device 422 and the output device 424, which enable users to interact directly with the user interface 102. These input devices 422 and output devices 424 provide real-time feedback and facilitate task monitoring, allowing users to stay informed of task progress, and any system updates. The input devices 422 capture real-time data from users and transmit it to the processor 404, while the output devices 424 display prioritized task sequences, updates on order status, and notifications for operational adjustments.

In various embodiments, the computing system 400 is extended and supported by a cloud-based infrastructure 432, which provides scalable storage, processing power, and data analytics. The cloud-based infrastructure 432 integrates the servers 430 with the computing system 400 to perform dynamic context-based searches.

The scalable cloud-based infrastructure 432 also serves as the primary hub for inter-facility communication, linking remote devices to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 400 may be processor-based. The processor-based computing system 400 may operate within a cloud-enabled, modular hardware environment designed for scalability and high availability. This broader infrastructure includes additional AI-optimized processing units, such as TPUs and GPUs, which are capable of handling the intensive computational requirements of machine learning algorithms used for demand forecasting, slotting optimization, and real-time task adjustments. The modular cloud architecture ensures that each facility can access centralized data and processing power, dynamically adjusting workflows based on system demands. It also allows the orchestration module to allocate resources optimally, whether from central servers or distributed cloud resource-specific processors, depending on task priorities and operational constraints.

The scalable cloud-based infrastructure 432 provides flexible storage, processing, and analytics capabilities across distributed computing environments. Cloud integration supports storage of historical data, remote processing of compute-intensive machine learning models, and real-time data access for multiple facilities. Managed through containerized applications and virtual machines, the cloud framework enables continuous software updates, enhanced disaster recovery, and dynamic resource allocation to accommodate varying operational demands. Cloud-based inter-facility communication ensures synchronized, efficient operations, with additional processing capacity allocated as needed.

Energy efficiency is also prioritized within the design of the system 100, with power management protocols integrated across hardware components to reduce the system's environmental impact. The distributed power architecture, supported by uninterruptible power supplies (UPS) and backup generators, ensures reliable operation and minimizes downtime, allowing the system to maintain continuity and efficiency during power disruptions.

The system 100 may include security protocols to provide data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as General Data Protection Regulation (GDPR) for data privacy, while data sovereignty protocols ensure that sensitive information meets regional compliance standards.

This computing system 400 represents an end-to-end, cloud-based server system that is adaptive and integrates AI-driven analytics, real-time data capture, robust security measures, and scalable cloud resources. The processor 404, memory modules, storage devices, and I/O components collectively enable data-driven decision-making, adjusting tasks in real time to respond to changing demands. Data flows seamlessly from cloud storage and I/O devices to the central processor, dynamically orchestrating resources to provide real-time updates to staff, maintain efficiency, and optimize performance across facilities. This robust, secure, and compliant system is designed to streamline operations, improve responsiveness, and support scalable growth in diverse logistics environments.

In summary, this integrated computing environment 400 offers a comprehensive solution for the dynamic context-based search system and method described in FIGS. 1-3, combining high-performance processing, advanced memory configurations, scalable cloud-based resources, and robust communication interfaces. It enables efficient and adaptive control over the system 100. Together, these elements establish a high-performance environment that supports continuous adaptation, precise task orchestration, and predictive optimization, fully realizing the functionalities described in the appended claims.

The presently disclosed query processing module 104 can harness AI technologies, integrating sophisticated machine learning models with cutting-edge computational infrastructure to solve complex problems, enhance decision-making, and execution of tasks across multiple cloud resources or cloud service providers. Designed with flexibility, scalability, and high-performance in mind, the system offers organizations a comprehensive AI solution tailored to their needs.

The query processing module 104 can be deployed across a range of environments, including public or private cloud infrastructures, fully on-premise infrastructures, or a hybrid configuration that is deployed using a combination of cloud-based and on-premises infrastructures. This flexibility allows organizations to select the best deployment strategy based on their operational, security, and scalability needs.

The computing system 400 of one or more computers perform particular operations or actions by virtue of having software, firmware, hardware, or a combination of them installed on the system that in operation causes or cause the system to perform the actions. One or more computer programs perform particular operations or actions by virtue of including instructions that, when executed by data processing apparatus, cause the apparatus to perform the actions.

Within the context of this disclosure, the term "module" refers to a functional unit that is configured to perform a defined function or set of functions within a system and is used as a broad and flexible term to describe components of the system 100 that may be implemented in hardware, software, firmware, or any combination thereof to accomplish one or more defined tasks or operations, and may be embodied as a discrete component, a portion of a program, a process executing on one or more processors, or a collection of subcomponents. A module may be physically co-located with other modules or distributed across multiple systems or devices, and may communicate with other modules via direct connections, buses, or network interfaces. In some implementations, a module may also form part of or interact with an engine. In one aspect, a module may be implemented as a self-contained functional unit to perform specific roles and may be part of a larger engine or system.

A hardware module may be a physical device or circuit designed to execute predefined functions. Examples include processors—central processing units (CPUs), digital signal processors (DSPs), graphics processing units (GPUs)—as well as memory devices (RAM, ROM, flash), network interfaces, power-management circuitry, and specialized devices such as application-specific integrated circuits (ASICs) or field-programmable gate arrays (FPGAs). These elements may communicate over buses, networks, or other interfaces that provide the bandwidth necessary for high-speed data transfer and operation.

A software module includes instructions stored in memory and executed by one or more processing units. Such modules may take the form of executable code, dynamic-link libraries (DLLs), software-development kits (SDKs), virtual-machine environments, or full applications. They implement algorithms, data processing, decision logic, and user-interface functionality, may be written in languages such as C++, Python, or Java, and may interact with peer modules through well-defined application-programming interfaces (APIs), middleware, or cloud services.

A firmware module includes low-level code stored in non-volatile memory (e.g., EEPROM or flash) that bridges hardware and higher-level software. Firmware provides the control logic required to configure, initialize, and manage hardware devices, handling tasks such as bootstrapping, protocol management, and power control. Firmware updates may be delivered remotely, allowing post-deployment enhancements and security patches without altering hardware.

Modules may communicate with one another via inter-process communication (IPC), message passing, remote procedure calls (RPC), or data buses. APIs, middleware layers, or network protocols (e.g., REST or gRPC) facilitate seamless interaction regardless of each module's underlying implementation, enabling distributed operation across local or networked environments.

The architecture embraces a plug-and-play approach, enabling modules to be added, removed, or modified dynamically. Such modularity may promote horizontal scaling—by deploying additional modules to increase parallel capacity—or vertical scaling—by augmenting individual modules with enhanced capabilities. This flexibility is particularly advantageous in distributed-computing contexts, including cloud platforms and multi-core processors.

Modules may support multithreading, parallel execution, or distributed computing in which tasks are partitioned across multiple hardware resources such as multi-core processors or distributed nodes. Load-balancing and task-synchronization mechanisms help ensure efficient resource utilization and reduced execution times for complex workloads.

Where appropriate, modules may integrate AI-driven components, including machine-learning models or neural networks that perform pattern recognition, decision making, or predictive analytics. Such AI modules may rely on pre-trained models or continuous learning and may exploit specialized accelerators—such as TPUs or GPUs—to achieve high performance.

For time-sensitive applications, modules may employ real-time processing capabilities such as low-latency execution, task prioritization, and event-driven architectures. Real-time operating systems (RTOS) or dedicated task schedulers within firmware or software modules help guarantee that critical operations meet specified deadlines.

Security features may be embedded at both hardware and software levels, including encryption, authentication, and access control to protect data and maintain operational integrity. Secure hardware elements—such as trusted-platform modules (TPMs) or secure enclaves—may store cryptographic keys and execute guarded operations, while software modules may implement firewalls, intrusion-detection systems (IDS), or secure-communication protocols such as TLS/SSL.

Modules may manage data through embedded databases, cloud-storage services, or other persistence mechanisms, and may synchronize data across distributed systems using version control, replication strategies, and consistency models ranging from eventual to strong consistency.

The described modules may be equally suitable for cloud deployments and edge-computing frameworks. In the cloud, a module may scale elastically with demand, whereas at the edge it may perform latency-sensitive processing close to the data source, thereby reducing reliance on centralized resources.

In power-constrained environments-such as Internet-of-Things (IoT) devices or battery-operated systems-modules may adopt energy-efficient designs that incorporate power-aware algorithms, dynamic voltage scaling, sleep states, or energy-harvesting technologies. Hardware modules may exploit semiconductor processes optimized for low energy consumption.

Each module may function as an independent, reusable component within the overall system architecture while remaining interoperable with peer modules. This approach affords flexibility, facilitates upgrades and maintenance, and supports deployment on dedicated hardware, within virtualized environments, or across distributed networks-all while delivering the comprehensive functionality described herein.

As used herein, the term "engine" refers to a functional block, component, or set of components that is configured to perform one or more specific operations or processes. An engine may be implemented in whole or in part as software, firmware, hardware, or any combination thereof. When implemented in software or firmware, an engine may comprise a set of machine-readable instructions stored in a memory and executed by one or more processors. When implemented in hardware, an engine may comprise dedicated or programmable circuitry, such as an application-specific integrated circuit (ASIC), a field-programmable gate array (FPGA), or other logic devices. An engine may also be distributed across multiple devices, nodes, or systems, and may operate in a local, remote, or cloud-based environment. In one aspect, an engine may part of a functional subsystem that drives a specific capability or set operations and may integrate multiple modules and may orchestrate the execution of a defined function or set of functions within a system.

As used herein, the term "node" generally refers to a computing entity that participates in a distributed computing environment. A node may be implemented as a physical machine, a virtual machine, a containerized computing instance, or another type of computational resource capable of executing instructions and exchanging data with other nodes. A node can include one or more processors, memory devices, persistent storage, communication interfaces, and associated hardware and software for performing processing tasks, storing and retrieving data, and transmitting and receiving information over one or more networks.

In some embodiments, a node may execute one or more processes, services, or application components that contribute to the overall operation of the distributed system. Nodes can operate as peers, clients, servers, intermediaries, or specialized functional components depending on system architecture. Nodes may be geographically co-located or dispersed, and may communicate using wired, wireless, or hybrid networking technologies. Communication between nodes can occur via various protocols, message formats, and routing schemes, and may include mechanisms for synchronization, fault tolerance, load balancing, or consensus.

Unless otherwise specified, references to a "node" herein encompass any physical or logical computing resource that participates in a distributed computing environment, whether implemented in hardware, software, or any suitable combination thereof.

In certain embodiments, the computer-readable storage devices, media, and memories may include wired or wireless signals that convey a bit stream or similar constructs. However, when the phrase "non-transitory computer-readable storage media" is used, it expressly excludes forms such as energy, carrier signals, electromagnetic waves, and signals per se.

The methods described herein may be realized through computer-executable instructions stored on, or otherwise made available by, computer-readable media. Such instructions may configure a general-purpose computer, a special-purpose computer, or a dedicated processing device to execute one or more of the functions outlined above. Portions of the required computing resources may reside on, and be accessed through, a network. The instructions themselves may be provided as binaries, intermediate-format instructions such as assembly language, firmware, or source code. Suitable computer-readable media include magnetic or optical storage, flash memory, USB devices equipped with non-volatile memory, and network-attached storage devices, among others.

Devices that implement these methods may combine hardware, firmware, and/or software and may assume a variety of form factors, including laptops, smartphones, small-form-factor personal computers, personal digital assistants, rack-mount appliances, and standalone units. Equivalent functionality may also be embodied in peripherals or add-in cards, or distributed across multiple chips or processes within a single device.

The instructions, the media that convey those instructions, the computing resources that execute them, and the supporting structures together constitute means for providing the functionality described in this disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, performed by a server-based query processing module comprising at least one processor and a memory, for dynamic search routing and retrieval using feedback-derived user interaction embeddings, the method comprising:

obtaining a search query via a user interface at a remote user device;

generating a query embedding for the query by executing a transformer-based embedding model, the query embedding representing the search query as a numeric vector;

retrieving relevant feedback-derived user interaction embeddings from a vector database based on similarities between the user interaction embeddings and the query embedding, wherein the user interaction embeddings are numeric vectors encoding feedback parameters extracted from user interface logs and session data for user interface interactions with search results of prior queries;

generating a query contextual classification vector for the search query based on aggregating the retrieved user interaction embeddings, organization metadata, and query parameters derived from the query embedding;

dynamically routing the query embedding to an optimized search model for the search query, wherein the optimized search model is selected from a model registry stored in the memory, the model registry comprising a lexical search model, a semantic search model, and a combined lexical-semantic search model, and wherein selecting the optimized search model comprises:

determining a keyword density score based on a computed similarity between the query contextual classification vector and a keyword-based reference vector;

determining a semantic intent score based on a computed similarity between the query contextual classification vector and a semantic reference vector; and selecting the lexical search model, the semantic search model, or the combined lexical-semantic search model as the optimized search model based on the keyword density score and the semantic intent score;

processing the query embedding using the optimized search model to retrieve candidate results;

dynamically adjusting a ranking of the candidate results based on computing similarities between the candidate result embeddings and the user interaction embeddings to prioritize candidate results aligned with prior user preferences encoded in the user interaction embeddings; and displaying, via the user interface at the remote device, the dynamically adjusted candidate results as search results for the query.

2. The method of claim 1, wherein selecting the lexical search model comprises:

determining, by a dynamic routing engine, the keyword density score by computing a cosine similarity between the query embedding and the keyword-based reference vector; and determining the keyword density score is above a keyword density threshold.

3. The method of claim 1, wherein selecting the semantic search model comprises:

determining, by a dynamic routing engine, the semantic intent score by computing a cosine similarity between the query contextual classification vector and the semantic reference vector; and determining the semantic intent score is above a semantic intent threshold.

4. The method of claim 1, wherein selecting the combined lexical-semantic search model comprises:

determining, by a dynamic routing engine, the keyword density score by computing a first cosine similarity between the query embedding and the keyword-based reference vector;

determining the keyword density score is above a keyword density threshold;

determining, by a dynamic routing engine, the semantic intent score by computing a second cosine similarity between the query contextual classification vector and the semantic reference vector; and determining the semantic intent score is above a semantic intent threshold.

5. The method of claim 1, further comprising:

monitoring, by the user interface, post-query user interactions to generate an additional interface log and additional session data for the search query;

extracting, by a feedback loop module, additional feedback parameters from the additional interface log and additional session data; and updating, by the feedback loop module, the vector database to include additional user interaction embeddings generated based on the additional feedback parameters.

6. The method of claim 5, wherein extracting the additional feedback parameters from the additional interface log and additional session data comprises extracting, by the feedback loop module, numerical features including one or more of a click-through rate, a dwell time, a bounce rate, and result selection data.

7. The method of claim 6, further comprising:

normalizing, by the feedback loop module, the numerical features; and encoding, by the feedback loop module, the normalized numerical features as the additional user interaction embeddings using a neural network.

8. The method of claim 5, wherein updating the vector database comprises:

appending, by a feedback loop module, the additional user interaction embeddings to an append-only memory segment of the vector database and updating a locality-sensitive hash (LSH) table using an incremental indexing operation.

9. The method of claim 5, wherein the vector database, managed by the feedback loop module, is user-specific, associating feedback-derived user interaction embeddings with a single user or class of users.

10. The method of claim 5, wherein updating the vector database comprises:

adjusting, by a feedback loop module, the user interaction embeddings based on a negative feedback indicator by recomputing cosine similarities to reduce weights of embeddings associated with non-selected results, the negative feedback indicator comprising at least one of a cart abandonment or absence of product selection within a dwell time threshold.

11. The method of claim 10, wherein dynamically adjusting the ranking of the candidate results comprises:

increasing, by an embedding-augmented re-ranking model, a candidate rank score of a candidate result associated with a user interaction embedding indicative of a prior product selection.

12. The method of claim 11, wherein the embedding-augmented re-ranking model increases the candidate rank score based on determining that a cosine similarity between the candidate result embedding and the user interaction embedding indicative of the prior product selection exceeds a relevance threshold.

13. The method of claim 5, further comprising:

prompting, by a feedback loop module via the user interface, the collection of explicit user feedback on search result relevance after a dwell time threshold; and storing, by the feedback loop module, the explicit feedback as a user interaction embedding in the vector database.

14. The method of claim 1, wherein generating the query embedding comprises:

preprocessing, by a query classification module, the search query to produce a normalized query for input to the transformer-based embedding model, the preprocessing including tokenizing the search query using rule-based logic and performing semantic enrichment using a large language model (LLM) executed on a graphics processing unit (GPU) or tensor accelerator.

15. The method of claim 1, further comprising:

executing, by a query classification module, a retrieval-augmented classification using a retrieval-augmented generation (RAG)-based model to retrieve the relevant user interaction embeddings and the organizational metadata from the vector database; and applying, by the query classification module, rule-based weighting to compute a cosine similarity between the query embedding and the retrieved user interaction embeddings.

16. The method of claim 1, wherein processing the query embedding using the optimized search model to generate the candidate results comprises executing the selected search model to identify candidate results from one or more product databases.

17. The method of claim 1, wherein the user interface logs and session data comprise one or more of result selection data, query refinement data, clickstream logs, bounce rate data, product return logs, dwell time data, scroll depth data, pointer trajectory sampling, and click sequence timing data.

18. The method of claim 1, wherein determining the query contextual classification vector comprises:

personalizing, by a query classification module, the query contextual classification vector based on hierarchical user data including at least one of user-specific history, department-level history, or enterprise-level history retrieved from the vector database.

19. The method of claim 1, wherein generating the query embedding comprises:

enriching, by a semantic analysis module, the query embedding with structured metadata including at least one of product category, product attributes, or organizational rules before selecting the search model.

20. A dynamic context-based search system, the system comprising:

a user interface configured to obtain a search query at a remote user device;

a vector database configured to store user interaction embeddings, where the user interaction embeddings are numerical vectors encoding feedback parameters extracted from user interface logs and session data for user interface interactions with search results of prior queries a query classification module configured to:

generate a query embedding for the query by executing a transformer-based embedding model, the query embedding representing the search query as a numeric vector;

retrieve relevant feedback-derived user interaction embeddings from the vector database based on similarities between the user interaction embeddings and the query embedding; and generate a query contextual classification vector for the search query based on aggregating the retrieved user interaction embeddings, organization metadata, and query parameters derived from the query embedding;

a model registry configured to store search models, the search models comprising a lexical search model, a semantic search model, and a combined lexical-semantic search model;

a dynamic routing engine configured to:

dynamically route the query embedding to a search model from the model registry optimized for the search query; and process the query embedding using the optimized search model to retrieve candidate results, wherein, to select the optimized search model from the model registry, the dynamic routing engine is configured to:

determine a keyword density score based on a computed similarity between the query contextual classification vector and a keyword-based reference vector;

determine a semantic intent score based on a computed similarity between the query contextual classification vector and a semantic reference vector; and select the lexical search model, the semantic search model, or the combined lexical-semantic search model as the optimized search model based on the keyword density score and the semantic intent score; and a feedback loop module configured to dynamically adjust a ranking of the candidate results based on computing similarities between the candidate result embeddings and the user interaction embeddings to prioritize candidate results aligned with prior user preferences encoded in the user interaction embeddings;

wherein the user interface is configured to display the dynamically adjusted candidate results as search results for the query.

21. A non-transitory computer-readable medium storing instructions that, when executed by one or more processors, cause a computing system to:

obtain a search query via a user interface at a remote user device;

generate a query embedding for the query by executing a transformer-based embedding model, the query embedding representing the search query as a numeric vector;

retrieve relevant feedback-derived user interaction embeddings from a vector database based on similarities between the user interaction embeddings and the query embedding, wherein the user interaction embeddings are numeric vectors encoding feedback parameters extracted from user interface logs and session data for user interface interactions with search results of prior queries;

generate a query contextual classification vector for the search query based on aggregating the retrieved user interaction embeddings, organization metadata, and query parameters derived from the query embedding;

dynamically route the query embedding to an optimized search model for the search query, wherein the optimized search model is selected from a model registry stored in the memory, the model registry comprising a lexical search model, a semantic search model, and a combined lexical-semantic search model, and wherein the instructions comprise search model selection instructions that are executable to cause the computing system to:

determine a keyword density score based on a computed similarity between the query contextual classification vector and a keyword-based reference vector;

determine a semantic intent score based on a computed similarity between the query contextual classification vector and a semantic reference vector; and select the lexical search model, the semantic search model, or the combined lexical-semantic search model as the optimized search model based on the keyword density score and the semantic intent score;

process the query embedding using the optimized search model to retrieve candidate results;

dynamically adjust a ranking of the candidate results based on computing similarities between the candidate result embeddings and the user interaction embeddings to prioritize candidate results aligned with prior user preferences encoded in the user interaction embeddings; and display, via the user interface at the remote device, the dynamically adjusted candidate results as search results for the query.

* * * * *